(12) United States Patent
Oto et al.

(10) Patent No.: US 6,604,354 B2
(45) Date of Patent: Aug. 12, 2003

(54) COMBINED CYCLE POWER PLANT

(75) Inventors: Chikako Oto, Tokyo (JP); Ryou Oda, Yokohama (JP); Sachio Shibuya, Tokyo (JP); Takehiro Isu, Yokohama (JP); Yoichi Sugimori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/988,143

(22) Filed: Nov. 19, 2001

(65) Prior Publication Data
US 2002/0059792 A1 May 23, 2002

(30) Foreign Application Priority Data
Nov. 17, 2000 (JP) ........................................ 2000-351875

(51) Int. Cl.$^7$ ................................ F02C 6/00; F02G 1/00
(52) U.S. Cl. ................................ 60/39.182; 60/39.163; 60/772
(58) Field of Search ....................... 60/39.182, 39.3, 60/39.55, 39.53, 39.163, 39.511, 772, 783

(56) References Cited

U.S. PATENT DOCUMENTS

| | | | | |
|---|---|---|---|---|
| 5,442,908 A | * | 8/1995 | Briesch et al. | 60/39.182 |
| 5,649,416 A | * | 7/1997 | Moore | 60/39.15 |
| 5,724,807 A | * | 3/1998 | Schuetzenduebel et al. | 60/39.464 |
| 5,761,896 A | * | 6/1998 | Dowdy et al. | 60/39.05 |
| 6,065,280 A | * | 5/2000 | Ranasinghe et al. | 60/39.02 |
| 6,116,017 A | * | 9/2000 | Mori et al. | 60/39.182 |
| 6,173,563 B1 | * | 1/2001 | Vakil et al. | 60/39.04 |
| 6,244,039 B1 | * | 6/2001 | Sugishita et al. | 60/39.182 |
| 6,339,926 B1 | * | 1/2002 | Ichiro et al. | 60/39.182 |
| 6,430,914 B1 | * | 8/2002 | Goidich et al. | 60/39.02 |

OTHER PUBLICATIONS

John S. Joyce, "Parallel–Powered Combined Cycles", MPS REVIEW, Jan. 1993, pp. 23,25,27.

* cited by examiner

Primary Examiner—Charles G. Freay
Assistant Examiner—Han L Liu
(74) Attorney, Agent, or Firm—Oblon, Spivak, McClelland, Maier & Neustadt, P.C.

(57) ABSTRACT

A combined cycle power plant generally comprises a gas turbine power facility, a heat recovery steam generator, a steam turbine power facility, and an existing boiler. The power generation plant further comprises a system for introducing steam, which is generated in the heat recovery steam generator and the existing boiler, to the steam turbine of the steam turbine power facility through steam lines, which extend from the existing boiler and heat recovery steam generator and are then joined together, and a system for causing a line, which is arranged on a downstream side of a condenser provided in the steam turbine power facility, to branch off into feedwater lines, and supplying condensed water condensed by the condenser into the heat recovery steam generator and the existing boiler.

18 Claims, 10 Drawing Sheets

COMBINED CYCLE POWER PLANT

BACKGROUND OF THE INVENTION

The present invention relates to a combined cycle power plant, which is a combination of a steam turbine power facility with a gas turbine power facility.

In recent years, there has been a greater increase in demand for an improved thermal efficiency in a thermal power facility. Especially, there has recently been a demand for development of a high thermal efficiency system utilizing the existing facilities in view of difficulty in acquiring the site of a new facility and decrease in construction costs. It is said that conversion of a conventional power plant into a combined cycle power generation system is the most effective way in order to provide such a high thermal efficiency.

With respect to measures for remodeling the existing conventional thermal power facility into the combined cycle power system, there have been known an exhaust gas re-combustion type power plant as shown in FIG. 10 and a heat recovery type power plant as shown in FIG. 11.

In the exhaust gas re-combustion type power plant as shown in FIG. 10, a combustion boiler, which is applied in an existing steam turbine power unit, is utilized as it is. More specifically, the existing steam turbine power unit A is provided generally with a steam turbine power facility 3 having a steam turbine 1 and a generator 2, a combustion boiler 4 for supplying steam to the steam turbine 1, a steam condenser 5 (which may be called merely condenser hereinlater) for condensing an exhaust gas from the steam turbine 1, a condenser pump 6 for supplying condensed water (i.e., condensate) to the combustion boiler 4 and the other components. A gas turbine power unit B, which is additionally provided in the above-mentioned steam turbine power unit A, is provided with a gas turbine power facility 10 having a combustor 7, a gas turbine 8, a generator 9 and the other components. A high-temperature gas, which still contain sufficiently large amounts of oxygen and unburned fuel discharged from the gas turbine 8 in sufficient amounts, is introduced as air for boiler combustion into a furnace of the combustion boiler 4 to burn fuel "F" and an exhaust gas after combustion is discharged from a stack 11. Such an exhaust gas re-combustion type power plant has advantageous features of permitting to enhance a boiler-efficiency and achieve heat recovery of a boiler-exhaust gas through heat exchange between the boiler-exhaust gas and a boiler-feedwater.

In the heat recovery type power plant as shown in FIG. 11, a heat recovery steam generator (HRSG) 12 is provided in place of the combustion boiler used in the existing steam turbine power unit so as to cause production of steam in the existing steam turbine power unit with the use of an exhaust gas from the gas turbine 8. The structural components as shown in FIG. 11 are identical to those in FIG. 10. Accordingly, the same reference numerals as in FIG. 10 are given to the identical components in FIG. 11 and description thereof is omitted. Such a heat recovery type power plant has advantageous features of permitting to introducing a high-temperature gas discharged from the gas turbine 8 into the heat recovery steam generator 12 to generate steam so as to drive the steam turbine 1 by the thus generated steam.

The above-described types of the power plant, however, has provided the following problems.

The exhaust gas re-combustion type power plant as shown in FIG. 10 provides a low improvement-value in efficiency of about 5% as a relative value. For example, there is assumed that a single 240 MW gas turbine of 1300° C. class is provided in an existing 500 Mw boiler/turbine facility to remodel such facility into a combined cycle power generation system having the same plant power output. The thermal efficiency of the existing plant is assumed as 40%. When the existing system is remodeled into the exhaust gas re-combustion power plant under such conditions, although the combination of the gas turbine as additionally provided and the existing steam turbine ensures the plant power output of 500 MW, the thermal efficiency is about 42%, thus leading to improvement merely of about 5% as a relative value.

When the existing system is remodeled into the heat recovery type power plant as shown in FIG. 11, there are problems of small power output and impossibility of an independent operation only by the existing boiler/turbine facility. More specifically, the system is composed of the gas turbine as additionally provided, the heat recovery steam generator as additionally provided and the existing steam turbine, and in such arrangement, the existing combustion boiler is removed. In such a case, the thermal efficiency is about 50%, leading to increase in a relative value by 25%, while the power output of 380 MW can merely be ensured, leading to decrease in power output by about 30%. The impossibility of the independent operation only by the existing boiler/turbine facility makes it impossible to carry out a power generation operation during a regular inspection of the gas turbine. Coal, fuel oil and the like are applied as fuel for the existing combustion boiler. Continuous application of such fuels cannot cope with demands for an improved high-thermal efficiency and reduced costs.

SUMMARY OF THE INVENTION

An object of the present invention, which was made in view of such circumstances, is to provide a combined cycle power plant, which permits, when an existing steam turbine power facility is remodeled to the combined cycle type, to ensure plant power output that is equal to that of the existing steam turbine power facility prior to remodeling, provide a remarkably improved thermal efficiency and carry out an independent operation of the existing facility with the use of the existing conventional boiler and steam turbine.

This and other objects of the present invention can be achieved according to the present invention by providing, in one aspect, a combined cycle power plant, comprising:

a gas turbine power facility;

a heat recovery steam generator into which an exhaust gas is introduced from the gas turbine power facility;

a steam turbine power facility having a steam turbine mounted to a shaft different from a shaft on which the gas turbine power facility is mounted;

an existing boiler for supplying steam to the steam turbine power facility;

a system for introducing steam, which is generated in the heat recovery steam generator and the existing boiler, into the steam turbine of the steam turbine power facility through steam lines, which extend from the heat recovery steam generator and the existing boiler and are then joined together; and a system for causing a line, which is arranged on a downstream side of a steam condenser provided in the steam turbine power facility, to branch off into feedwater lines, and supplying condensate condensed by the condenser into the heat recovery steam generator and the existing boiler.

In this aspect, the steam lines extending from the heat recovery steam generator and the existing boiler to the steam turbine and the feedwater lines extending from a condensed water pump of the steam condenser to the heat recovery steam generator and the existing boiler are provided with valves, respectively, to permit selection of any one of three operation patterns of: a simultaneous power generation operation of the gas turbine power facility and the steam turbine power facility utilizing the steam generated in both the steam generator and boiler; a simultaneous power generation operation of the gas turbine power facility and the steam turbine power facility utilizing only the steam generated in the heat recovery steam generator, while the existing boiler not being in operation (shut-down); and a single power generation operation of only the steam turbine power facility utilizing only the steam generated in the existing boiler, while shutting down the operation of the gas turbine.

The heat recovery steam generator is provided with a low-pressure economizer and there is provided a system for returning at least a part of feedwater, which is heated by the low-pressure economizer, to feedwater or condensed water on an upstream or downstream side of a deaerator provided on a condensed water line.

A recirculation line is arranged for returning the condensed water from the downstream side of the deaerator to the condenser to control oxygen concentration of the feedwater.

The steam condenser is provided, therein, with a deaerating device to control oxygen concentration of the feedwater.

The power plant may be further comprise a control device for controlling load of all the systems in accordance with an operation of at least one of the gas turbine, the steam generator and the boiler.

A single common stack is arranged for discharging the exhaust gas from the heat recovery steam generator and the exhaust gas from the existing boiler.

A first stack is arranged for discharging the exhaust gas from the heat recovery steam generator and a second stack is arranged, independently from the first stack, for discharging the exhaust gas from the existing boiler.

According to another aspect of the present invention, there is also provided a combined cycle power plant comprising:

a gas turbine power facility;

a heat recovery steam generator into which an exhaust gas is introduced from the gas turbine power facility;

a steam turbine power facility provided with a steam turbine mounted on a shaft which is different from a shaft on which the gas turbine power facility is mounted, the steam turbine power facility including high, intermediate and low pressure turbines;

an existing boiler for supplying steam to the steam turbine power facility;

a system for introducing a steam, which is generated in the heat recovery steam generator and the existing boiler, into the high-pressure turbine of the steam turbine power facility through steam lines, which extend from the steam generator and the boiler and are then joined together;

a system for distributing the steam, which has done work in the high-pressure turbine so as to reach a low temperature, to the heat recovery steam generator and the existing boiler through reheat lines and for supplying the steam, which has been reheated by the heat recovery steam generator and the existing boiler to a high-temperature reheat steam, to the intermediate and low pressure turbines in a combined state; and a system for causing a line, which is arranged on a downstream side of a condenser provided in the steam turbine power facility, to branch off into feedwater lines, and supplying condensed water condensed by the condenser into the heat recovery steam generator and the existing boiler.

In modified embodiment in this aspect, the steam lines extending from the heat recovery steam generator and the existing boiler to the steam turbine and said feedwater lines extending from a condensed water pump of the condenser to the heat recovery steam generator and the existing boiler are provided with valves, respectively, to permit selection of any one of three operation patterns of: a simultaneous power generation operation of the gas turbine power facility and the steam turbine power facility utilizing the steam generated in both the steam generator and boiler; a simultaneous power generation operation of the gas turbine power facility and the steam turbine power facility utilizing only the steam generated in the heat recovery steam generator, while the existing boiler being not operated; and a single power generation operation of only the steam turbine power facility utilizing only the steam generated in the existing boiler, while shutting down the operation of the gas turbine.

A steam line is arranged for introducing the steam generated from the heat recovery steam generator into a first stage of the low pressure turbine or a middle stage thereof of the steam turbine power facility or a middle stage of the intermediate pressure turbine.

An extraction line is arranged for introducing the steam from the lower pressure turbine into a feedwater heater, which is disposed in a condensation system of the steam turbine power facility, and a line for introducing the steam generated from the heat recovery steam generator is connected to the extraction line.

The heat recovery steam generator is provided with a low-pressure economizer and there is provided a system for returning at least a part of feedwater, which is heated by the low-pressure economizer, to feedwater or condensed water on an upstream or downstream side of a deaerator provided on a condensed water line.

A recirculation line is arranged for returning the condensed water from the downstream side of the deaerator to the steam condenser to control oxygen concentration of the feedwater.

The steam condenser is provided, therein, with a deaerating device to control oxygen concentration of the feedwater.

At least one of reheat lines, which introduce the low temperature steam from the high-pressure turbine to the heat recovery steam generator or the existing boiler, is provided with a distributing valve for adjusting a distribution ratio of the steam having the low temperature.

The combined cycle power plant may further comprises a control device for controlling load of all the systems in accordance with an operation of at least one of the gas turbine, the steam generator and the boiler.

A single common stack is arranged for discharging the exhaust gas from the heat recovery steam generator and the exhaust gas from the existing boiler.

A first stack is arranged for discharging the exhaust gas from the heat recovery steam generator and a second stack is arranged, independently from the first stack, for discharging the exhaust gas from the existing boiler.

In a further aspect of the present invention, there is provided a combined cycle power plant comprising:

a gas turbine power facility;

a heat recovery steam generator into which an exhaust gas is introduced from the gas turbine power facility;

a steam turbine power facility provided with a steam turbine mounted on a shaft which is different from a shaft on which the gas turbine power facility is mounted, the steam turbine power facility including high and low pressure turbines;

an existing boiler for supplying steam to the steam turbine power facility;

a system for introducing steam, which is generated in the heat recovery steam generator and the existing boiler, into the steam turbine through steam lines, which extend from the steam generator and the boiler and are then joined together;

a system for supplying feedwater condensed by a condenser to the low pressure state by branching off lines at an outlet portion of a condensed water pump provided for the steam turbine power facility and for supplying feedwater supplied to the heat recovery steam generator to a low pressure turbine through a low pressure economizer, a low pressure drum and a low pressure superheater; and a system for supplying feedwater, which is supplied to the existing boiler, to a feedwater pump through a deaerator, branching off lines at an outlet stage of the feedwater pump, supplying the feedwater to a high pressure stage of the heat recovery steam generator and the existing boiler and supplying the feedwater supplied to the heat recovery steam generator to the high pressure turbine, after joining to steam generated from the existing boiler, through a high pressure economizer, a high pressure drum and a high pressure steam superheater.

According to the present invention described above, it is possible to ensure, when an existing steam turbine power facility is remodeled into a combined cycle type, the plant power that is equal to that of the existing steam turbine power facility prior to remodeling, provide a remarkably improved thermal efficiency and carry out an independent operation of the existing facility with the use of the existing existing boiler and steam turbine, thus providing such useful effects.

Further, as for the fuel, it is also possible to use various kinds of fuel such as LNG (liquid natural gas), fuel oil and coal, leading to reduction in running cost.

The nature and further characteristic features of the present invention will be made more clear from the following descriptions made with reference to the accompanying drawings.

DESCRIPTION OF THE PREFERRED EMBODIMENT

Description will be given below of a combined cycle power plant of the present invention with reference to FIGS. 1 to 9.

Figure 1:
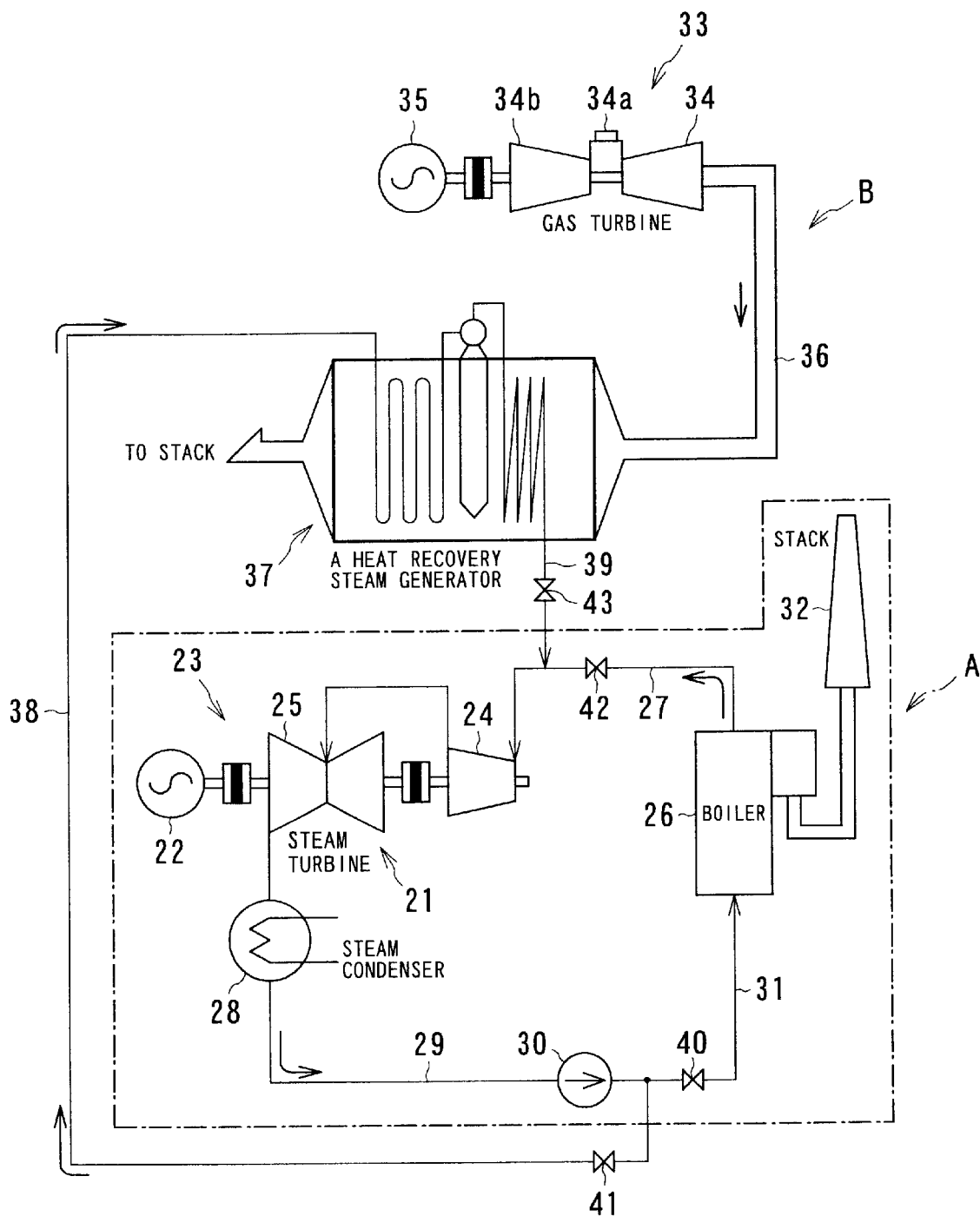
FIG. 1 is a schematic diagram of a system illustrating a first embodiment of a combined cycle power plant of the present invention.

First Embodiment (FIG. 1)

FIG. 1 is a schematic diagram of a system illustrating a first embodiment of the present invention.

As shown in FIG. 1, a combined cycle power plant of the first embodiment of the present invention is a combination of an existing steam turbine power unit A and a gas turbine power unit B additionally provided thereto. The steam turbine power unit A has a steam turbine power facility 23, which is composed of a steam turbine 21 and a generator 22. The steam turbine 21 has a two-stage structure of for example a high-pressure turbine 24 and a low-pressure turbine 25.

Steam is supplied from an existing boiler 26, such as coal-fired or oil-fired boiler, through a steam line 27 to the high-pressure turbine 24. The thus supplied steam is expanded while passing through the high-pressure turbine 24 and the low-pressure turbine 25 so as to do work of driving the generator 22 to make a rotational motion, and then, is condensed by a steam condenser (merely, condenser) 28. A condenser pump 30 and not-shown components such as feedwater heater and deaerator are connected to the condenser 28 through a condensed water line 29 so that the condensed water circulates from a feedwater line 31 to the existing boiler 26 through such a condensed water system. Steam for the steam turbine is generated in the existing boiler 26 through combustion of fuel. An exhaust gas passes through a purifier, not shown, and is then discharged from a stack 32.

The gas turbine power unit B additionally provided has components serving as a gas turbine power facility 33 such as a gas turbine 34, a combustor 34a, an air compressor 34b and a generator 35. An exhaust gas discharged from the gas turbine power facility 33 is sent to a heat recovery steam generator 37 through an exhaust gas line 36. The exhaust gas contributes to generation of steam through heat exchange with the feedwater in the heat recovery steam generator 37 and then passes through a purifier, not shown, and is then discharged from a stack.

In this embodiment of the present invention, the line arranged on the downstream side of the condenser 28 branches off into two lines. One line serves as a feedwater line 38 for supplying the feedwater to the heat recovery steam generator 37 and the other line serves as a feedwater line 31 for supplying the feedwater to the existing boiler 26. A steam line 39 from the heat recovery steam generator 37 and the steam line 27 from the existing boiler 26 are joined together and are led into the high-pressure turbine 24.

Steam generated from the heat recovery steam generator 37 and the existing boiler 26 is supplied into the steam turbine 21 to do work, and is then condensed by the condenser 28 and pressurized by the condenser pump 30. The thus compressed condensed water circulates in the heat recovery steam generator 37 and the existing boiler 26.

The feedwater lines 31, 38 and the steam lines 27, 39 are provided with gate valves 40, 41, 42, 43, respectively so as to perform switching operations of flows of steam and feedwater, which are supplied to the steam turbine 21, by opening or closing these gate valves.

When all the gate valves 40, 41, 42, 43 are opened for example, steam generated in both of the heat recovery steam generator 37 and the existing boiler 26 is supplied to the steam turbine 21 so as to perform a simultaneous power generation operation of the gas turbine power facility 33 and the steam turbine power facility 23.

When the existing boiler 26 is shutdown (not operated), the gate valve 40 of the feedwater line 31 and the gate valve 42 of the steam line 27 on the side of the existing boiler 26 are closed, and the gate valve 41 of the feedwater line 38 and the gate valve 43 of the steam line 39 on the side of the heat recovery steam generator 37 are opened, it is possible to perform a simultaneous power generation operation of the gas turbine power facility 33 and the steam turbine power facility 23 utilizing only the steam generated in the heat recovery steam generator 37.

When the gas turbine power facility 33 is not operated, the gate valve 40 of the feedwater line 31 and the gate valve 42 of the steam line 27 on the side of the existing boiler 26 are opened, and the gate valve 41 of the feedwater line 38 and the gate valve 43 of the steam line 39 on the side of the heat recovery steam generator 37 are closed in a manner reverse to the above-mentioned case, it is possible to perform a single power generation operation of only the steam turbine power facility 33 utilizing only the steam generated in the existing boiler 31.

In the above-mentioned embodiment of the present invention, the gas turbine power unit B having the heat recovery steam generator 37 is additionally provided, while leaving the existing boiler 26 of the existing steam turbine power unit A as it is, and there are provided the system for introducing the steam generated in the heat recovery steam generator 37 and the existing boiler 26 into the steam turbine 21 through the steam lines 27, 39, which are extended from the steam generator 37 and the boiler 26, respectively, and joined together, as well as the system in which the line on the downstream side of the steam condenser 28 branches off so as to supply the condensed water, which has been pressurized by the condensed water pump 30 that is connected to the outlet side of the condenser 28, into the heat recovery steam generator 37 and the existing boiler 26. As a result, it is possible to remarkably enhance the thermal efficiency in comparison with the conventional exhaust gas re-combustion type power plant and ensure the plant power output that is equal to that of the existing steam turbine power facility prior to remodeling.

In addition, the steam lines 39, 27 extending from the heat recovery steam generator 37 and the existing boiler 26 to the steam turbine 21 and the feedwater lines 38, 31 extending from the condenser 28 to the heat recovery steam generator 37 and the existing boiler 26 are provided with the gate valves 40, 41, 42, 43, respectively. It is therefore possible to permit selection of any one of three operation patterns of (i) a simultaneous power generation operation of the gas turbine power unit B and the steam turbine power unit A utilizing the steam generated in both of the steam generator 37 and the boiler 26, (ii) a simultaneous power generation operation of the gas turbine power unit B and the steam turbine power unit A utilizing only the steam generated in the heat recovery steam generator 37, while the existing boiler 26 being not in operatation, and (iii) a single power generation operation of only the steam turbine power unit A utilizing only the steam generated in the existing boiler 26, while the gas turbine 34 being not operated. Any operation based on these patterns will be carried out in accordance with the operation demand. Especially, there is also provided an effect that an independent operation of the existing plant can be carried out, which has not been provided by the conventional heat recovery power plant.

Figure 2:
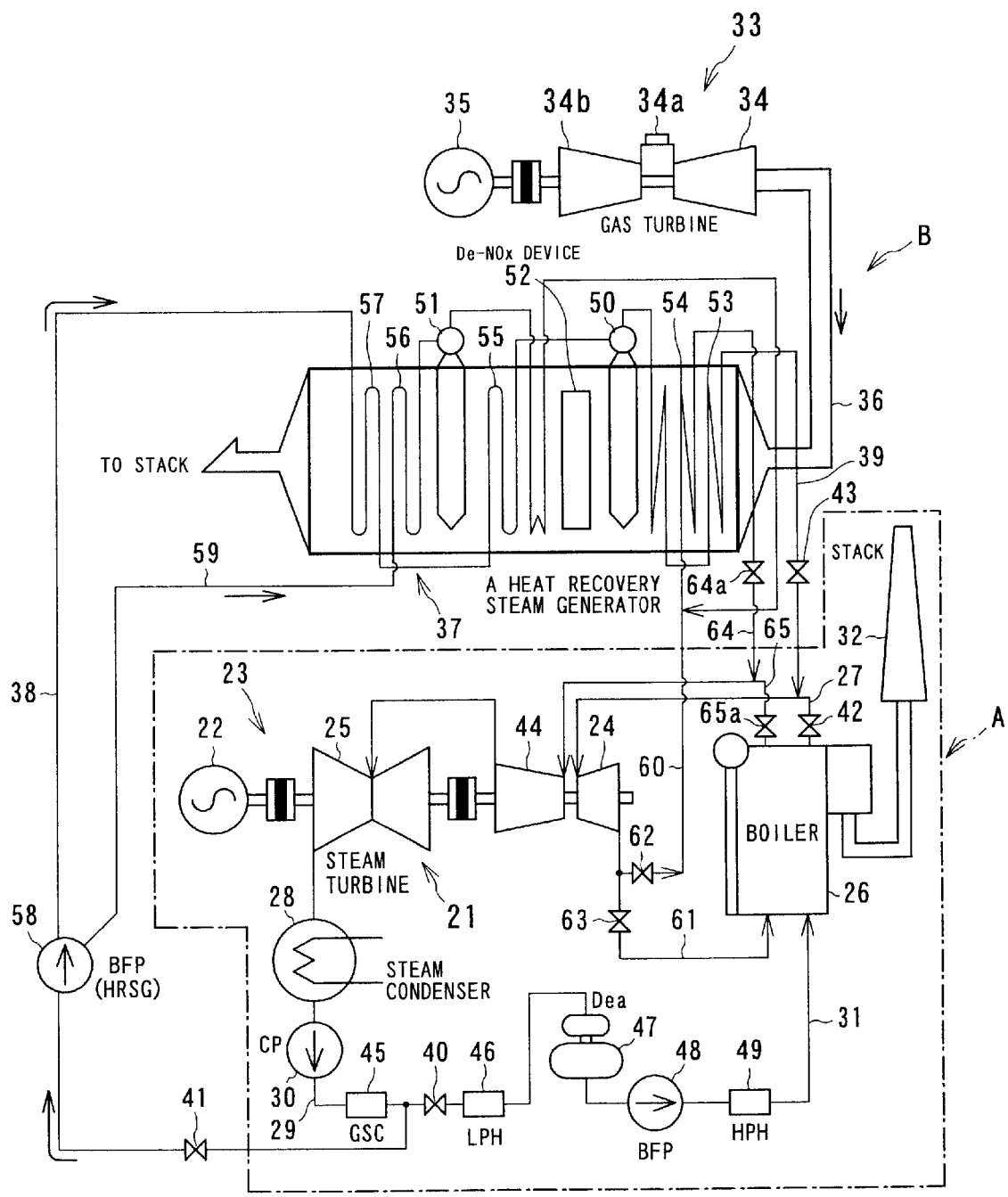
FIG. 2 is a schematic diagram of a system illustrating a second embodiment of a combined cycle power plant of the present invention.

Second Embodiment (FIG. 2)

FIG. 2 is a schematic diagram of a system illustrating a second embodiment of the present invention. The same reference numerals as in FIG. 1 are given to the identical components in FIG. 2.

As shown in FIG. 2, the combined cycle power plant of the second embodiment of the present invention is also a combination of an existing steam turbine power unit A and a gas turbine power unit B additionally provided thereto. The steam turbine power unit A has a steam turbine power facility 23, which is composed of a steam turbine 21 and a generator 22. The steam turbine 21 has a three-stage structure of for example a high-pressure turbine 24, an intermediate pressure turbine 44 and a low-pressure turbine 25.

Main steam is supplied from a existing boiler 26 through a steam line 27 to the high-pressure turbine 24. The thus supplied main steam is expanded while passing through the high-pressure turbine 24 and the low-pressure turbine 25 so as to drive the generator 22 to make a rotational motion, and then, condensed by a steam condenser 28. A condensed water line 29, which is connected to the condenser 28, is provided with a condenser pump 30, a gland steam condenser 45, a low-pressure feedwater heater 46, a deaerator 47 and the other components, thus forming a condensed water system. A feedwater line 31, which is connected to the condensed water system, is provided with a feedwater pump 48, a high-pressure feedwater heater 49 and the other components. Condensed water circulates from the feedwater line 31 to the existing boiler 26. Steam for the steam turbine is generated in the existing boiler 26 through combustion of fuel. An exhaust gas passes through a not-shown purifier and is then discharged from a stack 32.

The gas turbine power unit B additionally provided has components serving as a gas turbine power facility 33 including a gas turbine 34, a combustor 34a, an air compressor 34b and a generator 35. An exhaust gas discharged from the gas turbine power facility 33 is sent to an heat recovery steam generator 37 through an exhaust gas flue (line) 36. The exhaust gas contributes to generation of steam through heat exchange with the feedwater in the heat recovery steam generator 37 and then passes through a not-shown purifier, and is discharged from a stack. The heat recovery steam generator 37, which has a high-pressure drum 50, a low-pressure drum 51, a denitration (de-NOx)device 52 and the other components, is provided with further additional components such as a high-pressure superheater 53, a high-pressure reheater 54, a high-pressure economizer 55, a low-pressure reheater 56 and a low-pressure economizer 57 from the exhaust gas inlet side.

In this embodiment of the present invention, the line arranged on the downstream side of the condenser 28 branches off into two lines. One line serves as a feedwater line 38 for supplying the feedwater to the heat recovery steam generator 37. The feedwater line 38 is connected to the low-pressure economizer 57. The feedwater line 38 extending to the heat recovery steam generator 37 is provided with a feedwater pump 58. The feedwater line 38 branches off at a position of the feedwater pump 58 so that the resultant branch line is connected for example to the low-pressure reheater 56. The other line portion serves as the above-mentioned feedwater line 31 extending to the existing boiler 26.

A steam line 39 from the heat recovery steam generator 37 and the steam line 27 from the existing boiler 26 are joined together and then introduced into the high-pressure turbine 24.

Steam generated from the heat recovery steam generator 37 and the existing boiler 26 is supplied into the steam turbine 21 to do work (i.e., drive the generator 22), and then condensed by the steam condenser 28 and pressurized by the condenser pump 30. The thus pressurized condensed water circulates in the heat recovery steam generator 37 and the existing boiler 26.

The feedwater lines 31, 38 and the steam lines 27, 39 are provided with gate valves 40, 41, 42, 43, respectively, so as to perform switching operations of flows of steam and boiler feedwater, which are supplied to the steam turbine 21, by opening or closing these gate valves.

When all the gate valves 40, 41, 42, 43 are opened for example, steams generated in both of the heat recovery steam generator 37 and the existing boiler 26 are supplied to the steam turbine 21 so as to perform a simultaneous power generation operation of the gas turbine power facility 33 and the steam turbine power facility 23.

When the existing boiler 26 is not operated, and the gate valve 40 of the feedwater line 31 and the gate valve 42 of the steam line 27 on the side of the existing boiler 26 are closed and the gate valve 41 of the feedwater line 38 and the gate valve 43 of the steam line 39 on the side of the heat recovery steam generator 37 are opened, it is possible to perform a simultaneous power generation operation of the gas turbine power facility 33 and the steam turbine power facility 23 utilizing only the steam generated in the heat recovery steam generator 37.

When the gas turbine power facility 33 is not in operation, the gate valve 40 of the feedwater line 31 and the gate valve 42 of the steam line 27 on the side of the existing boiler 26 are opened, and the gate valve 41 of the feedwater line 38 and the gate valve 43 of the steam line 39 on the side of the heat recovery steam generator 37 are closed in a manner reverse to the above-mentioned case, it is possible to perform a single power generation operation of only the steam turbine power facility 33 utilizing only the steam generated in the existing boiler 26.

In the above-mentioned embodiment of the present invention, there are provided reheat lines 60, 61 for distributing the steam, which has done work in the high-pressure turbine 24 to reach a low temperature so that such a low-temperature steam is distributed to the heat recovery steam generator 37 and the existing boiler 26 through these reheat lines 60, 61. The reheat lines 60, 61 are mounted with distributing valves 62, 63 for adjusting distribution ratio of the low-temperature steam, respectively. The low-temperature steam from the respective reheat lines 60, 61 is introduced into the heat recovery steam generator 37 and the existing boiler 26 via a different route from the main steam system to become a high-temperature steam. The high-temperature steam, which is sent from the steam generator 37 through the steam line 64 having the distributing valve 64a, and the high-temperature steam, which is sent from the boiler 26 through the steam line 65 having the distributing valve 65a, are joined together due to the joining of both the steam lines 64, 65 and then supplied, for example, to the intermediate pressure turbine 44. Provision of such distributing valves 62, 63 makes it possible to control equally the flow rate of the main steam of the heat recovery steam generator 37 and the flow rate of the low-temperature steam, which flows into the heat recovery steam generator 37 so as to make the balance between the flow rate of the main steam and the flow rate of reheated steam in an ordinary boiler equal to that of the existing steam turbine power facility during the operation thereof.

In addition, a control device, though not shown, is arranged to control load of the entire system. The control device has a control function for controlling, in cooperation, by means of the gas turbine 34, the boiler 26 and the steam generator 37, or the gas turbine and the boiler 26 and the steam generator 37. More specifically, the control of the load of the entire system can be made by controlling an amount of fuel supplied into the gas turbine 34 or changing the output of the gas turbine 34 or an amount of steam generated in the heat recovery steam generator 37. Such load control can also be made by controlling an amount of fuel supplied into the existing boiler 26 to change an amount of steam generated in the existing boiler 26 or controlling both amounts of fuel supplied into the gas turbine 34 and the existing boiler 26.

The steam condenser 28 is provided therein with a deaerating tray and a condenser recirculation system, which serve as a deaerator, not shown. Deaerating the condensed water with the use of the deaerator makes it possible to control oxygen concentration of the feedwater. There may be used, as the deaerator included in the condenser, a steam bubbling device in a hot well.

According to the above-described embodiment of the present invention, it is possible to provide the effects described below, in addition to the effects of remarkably improving the thermal efficiency, ensuring the plant power output, that is equal to that of the existing plant prior to remodeling, and permitting to perform an independent operation of the existing steam turbine power unit and the other effects mentioned above, which are provided in the same manner as that of the first embodiment.

More specifically, the distributing valves 62, 63 for adjusting distribution rate of the low-temperature reheated steam is provided on the reheat line extending to the heat recovery steam generator 37, or the reheat line extending to the existing boiler 26 or both of them. Accordingly, it is possible to equally control the flow rate of the main steam of the heat recovery steam generator 37 and the flow rate of the low-temperature reheated steam, which flows into the heat recovery steam generator 37 so as to make the balance between the flow rate of the main steam and the flow rate of the reheated steam in the existing boiler 26 equal to that of the existing steam turbine power facility during the operation thereof.

The control of the load of the entire system can be made by controlling an amount of a fuel supplied into the gas turbine 34, or changing the power output of the gas turbine 34 or an amount of steam generated in the heat recovery steam generator 37.

In addition, the deaeration of the condensed water with the use of the deaerator makes it possible to control oxygen concentration of the feedwater.

Figure 3:
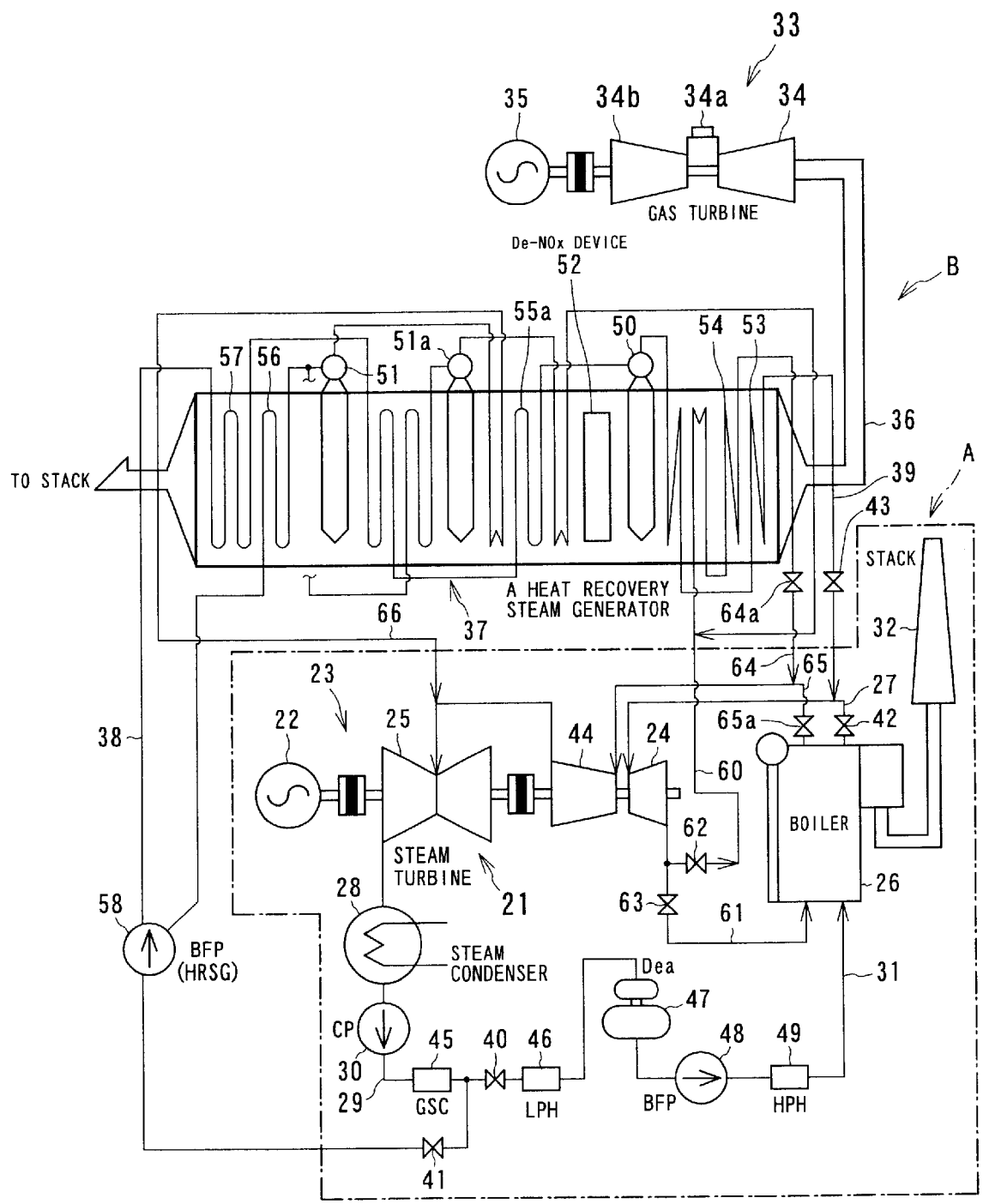
FIG. 3 is a schematic diagram of a system illustrating a third embodiment of a combined cycle power plant of the present invention.

Third Embodiment (FIG. 3)

FIG. 3 is a schematic diagram of a system illustrating the third embodiment of the present invention.

As shown in FIG. 3, the combined cycle power plant of the third embodiment of the present invention is also a combination of the existing steam turbine power unit A and a gas turbine power unit B additionally provided thereto. The steam turbine power unit A has a steam turbine power facility 23, which is composed of a steam turbine 21 and a generator 22. The steam turbine 21 has a three-stage structure of, for example, a high-pressure turbine 24, an intermediate pressure turbine 44 and a low-pressure turbine 25.

Main steam is supplied from a existing boiler 26 through a steam line 27 to the high-pressure turbine 24. The thus supplied main steam is expanded while passing through the high-pressure turbine 24 and the low-pressure turbine 25 so as to do drive the generator 22 to make a rotational motion and is then condensed by a steam condenser 28. A condensed water line 29, which is connected to the condenser 28, is provided with a condenser pump 30, a gland steam condenser 45, a low-pressure feedwater heater 46, a deaerator 47 and the other components, thus forming a condensed water system. A feedwater line 31, which is connected to the condensed water system, is provided with a feedwater pump 48, a high-pressure feedwater heater 49 and the other components. The condensed water circulates from the feedwater line 31 to the existing boiler 26. Steam for the steam turbine is generated in the existing boiler 26 through combustion of fuel. An exhaust gas passes through a not-shown purifier and is then discharged from a stack 32.

The gas turbine power unit B additionally provided has components serving as a gas turbine power facility 33 including a gas turbine 34, a combustor 34a, an air compressor 34b and a generator 35. An exhaust gas discharged from the gas turbine power facility 33 is sent to an heat recovery steam generator 37 through an exhaust gas flue 36. The exhaust gas contributes to generation of steam through heat exchange with the feedwater in the heat recovery steam generator 37, passes through a not-shown purifier and is then discharged from a stack. The heat recovery steam generator 37, which has a high-pressure drum 50, an intermediate pressure drum 51a, a low-pressure drum 51, a de-NOx device 52 and the other components, is provided with further additional components such as a high-pressure superheater 53, a high-pressure reheater 54, a high-pressure economizer 55a, a low-pressure reheater 56 and a low-pressure economizer 57 from the exhaust gas inlet side.

In the embodiment of the present invention, the line arranged on the downstream side of the condenser 28 branches off into two lines. One line serves as a feedwater line 38 for supplying the feedwater to the heat recovery steam generator 37. The feedwater line 38 is connected to the low-pressure economizer 57. The feedwater line 38 extending to the heat recovery steam generator 37 is provided with a feedwater pump 58. The feedwater line 38 branches off at a position of the feedwater pump 58 so that the resultant branch line 59 is connected for example to the low-pressure reheater 56. The other line serves as the above-mentioned feedwater line 31 extending to the existing boiler 26.

A steam line 39 extending from the heat recovery steam generator 37 and the steam line 27 extending from the existing boiler 26 are joined together and then introduced into the high-pressure turbine 24.

Steam generated from the heat recovery steam generator 37 and the existing boiler 26 is supplied into the steam turbine 21 so as to do the work (i.e., drive the generator 22) and then condensed by the steam condenser 28 and compressed by the condenser pump 30. The thus pressurized condensed water circulates in the heat recovery steam generator 37 and the existing boiler 26.

The feedwater lines 31, 38 and the steam lines 27, 39 are provided with gate valves 40, 41, 42, 43, respectively so as to perform the switching operations of flows of steam and boiler feedwater, which are supplied to the steam turbine 21, by opening or closing these gate valves.

When all the gate valves 40, 41, 42, 43 are opened for example, steams generated in both the heat recovery steam generator 37 and the existing boiler 26 are supplied to the steam turbine 21 so as to carry out a simultaneous power generation operation of the gas turbine power facility 33 and the steam turbine power facility 23.

When the existing boiler 26 is not operated, and the gate valve 40 of the feedwater line 31 and the gate valve 42 of the steam line 27 on the side of the existing boiler 26 are closed and the gate valve 41 of the feedwater line 38 and the gate valve 43 of the steam line 39 on the side of the heat recovery steam generator 37 are opened, it is possible to perform a simultaneous power generation operation of the gas turbine power facility 33 and the steam turbine power facility 23 utilizing only the steam generated in the heat recovery steam generator 37.

When the gas turbine power facility 33 is not operated, the gate valve 40 of the feedwater line 31 and the gate valve 42 of the steam line 27 on the side of the existing boiler 26 are opened, and the gate valve 41 of the feedwater line 38 and the gate valve 43 of the steam line 39 on the side of the heat recovery steam generator 37 are closed in a manner reverse to the above-mentioned case, it is possible to perform a single power generation operation of only the steam turbine power facility 33 utilizing only the steam generated in the existing boiler 26.

In the above-mentioned embodiment of the present invention, there are provided reheat lines 60, 61 for distributing the steam, which has done the work in the high-pressure turbine 24 to obtain a low temperature so that such a low-temperature steam is distributed to the heat recovery steam generator 37 and the existing boiler 26 through these reheat lines 60, 61. The reheat lines 60, 61 have distributing valves 62, 63 for adjusting distribution ratio of the low-temperature steam, respectively. The low-temperature steam from the respective reheat lines 60, 61 is introduced into the heat recovery steam generator 37 and the existing boiler 26 via a different route from the main steam system to become a high-temperature steam. The high-temperature steam, which is sent from the steam generator 37 through the steam line 64 having the distributing valve 64a, and the high-temperature steam, which is sent from the boiler 26 through the steam line 65 having the distributing valve 65a, join together due to the joining of both the steam lines 64, 65 and are supplied for example to the intermediate pressure turbine 44. Provision of such distributing valves 62, 63 makes it possible to control equally the flow rate of the main steam of the heat recovery steam generator 37 and the flow rate of the low-temperature steam, which flows into the heat recovery steam generator 37 so as to make the balance between the flow rate of the main steam and the flow rate of reheated steam in an ordinary boiler equal to that of the existing steam turbine power facility during the operation thereof.

In addition, a control device, though not shown, is provided for controlling the load of the entire system. The control device has a control function in the cooperation manner by means of the gas turbine 34, the existing boiler 26 and the steam generator 37, or the gas turbine and the boiler 26 and steam generator 37. More specifically, the control of the load of the entire system can be made by controlling an amount of the fuel supplied into the gas turbine 34, or changing the output power of the gas turbine 34 or an amount of the steam generated in the heat recovery steam generator 37. The load control can also be made by controlling an amount of the fuel supplied into the existing boiler 26 to change an amount of the steam generated in the existing boiler 26 or controlling both amounts of fuel supplied into the gas turbine 34 and the existing boiler 26.

The steam condenser 28 is provided therein with a deaerating tray and a condenser recirculation system, which serve as deaerator, not shown. Deaerating the condensed water with the use of the deaerator makes it possible to control the oxygen concentration of the feedwater. There may be used, as the deaerator included in the condenser, a steam bubbling device in a hot well.

In the third embodiment of the present invention, there is further provided a steam line 66 for introducing steam, which is generated in the low-pressure drum 51 of the heat recovery steam generator 37, into an inlet of the low-pressure turbine 25 of the steam turbine 21. The steam line 66 may be connected to the middle stage of the low-pressure turbine 25 or the middle stage of the intermediate pressure turbine 44.

Introducing steam, which is generated in the low-pressure drum 51 of the heat recovery steam generator 37, into the inlet of the low-pressure turbine 25 of the steam turbine 21 or the appropriate position mentioned above makes it possible to improve the efficiency of the steam turbine 21.

According to the above-described embodiment of the present invention, it is possible to provide the following advantageous effects in addition to the effects of remarkably improving the thermal efficiency, ensuring the plant power output, that is equal to that of the existing plant prior to remodeling, and permitting to carry out an independent operation of the existing steam turbine power unit and the other effects mentioned above, which are achieved in the same manner as the first and second embodiments.

More specifically, introducing steam, which is generated in the low-pressure drum 51 of the heat recovery steam generator 37, into the inlet of the low-pressure turbine 25 of the steam turbine 21 or the appropriate position mentioned above makes it possible to improve the efficiency of the steam turbine 21.

Figure 4:
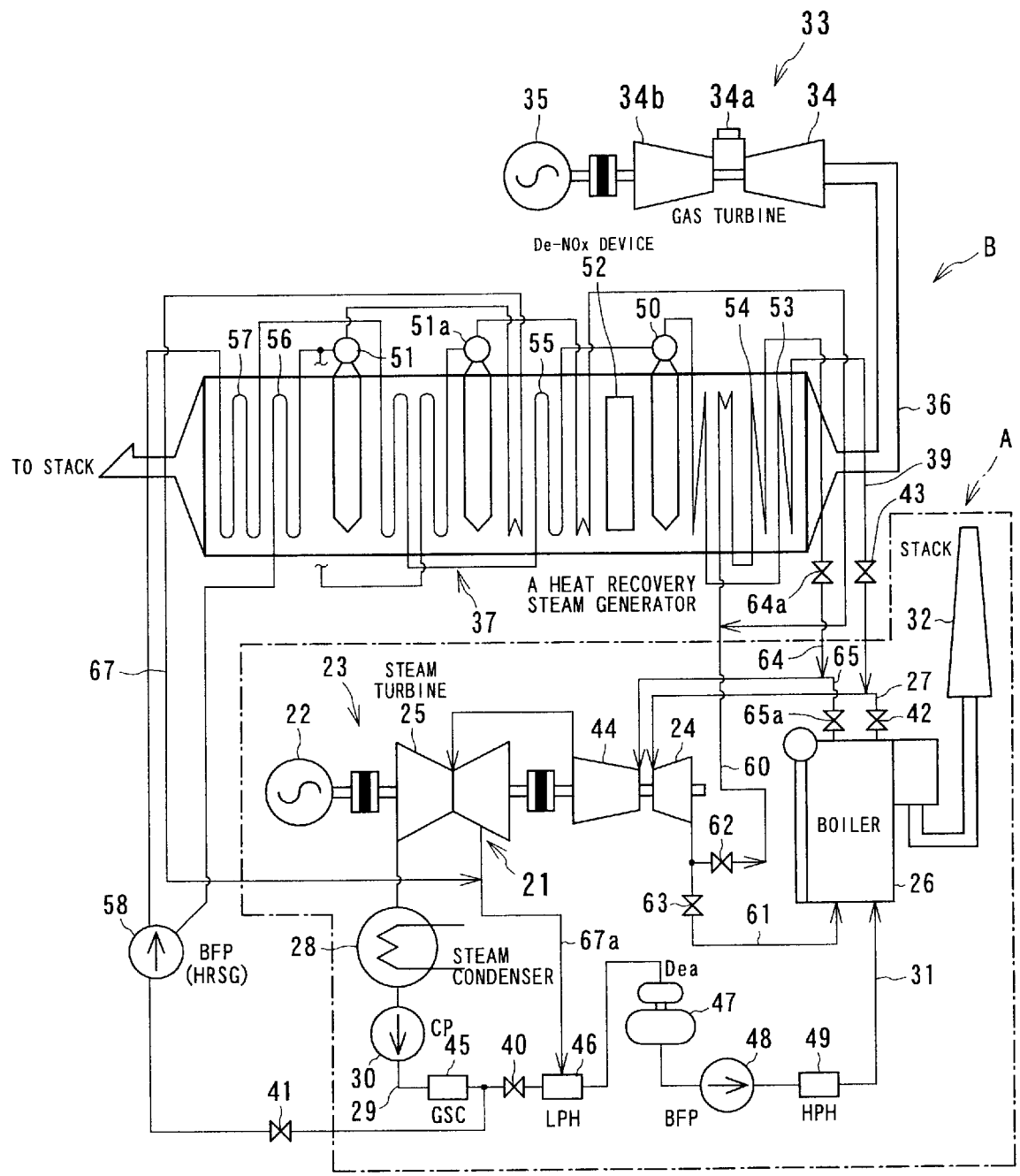
FIG. 4 is a schematic diagram of a system illustrating a fourth embodiment of a combined cycle power plant of the present invention.

Fourth Embodiment (FIG. 4)

FIG. 4 is a schematic diagram of a system illustrating the fourth embodiment of the present invention.

As shown in FIG. 4, the combined cycle power plant of the fourth embodiment of the present invention is also a combination of the existing steam turbine power unit A and a gas turbine power unit B additionally provided thereto. The steam turbine power unit A has a steam turbine power facility 23, which is composed of a steam turbine 21 and a generator 22. The steam turbine 21 has a three-stage structure of, for example, a high-pressure turbine 24, an intermediate pressure turbine 44 and a low-pressure turbine 25.

Main steam is supplied from a existing boiler 26 through a steam line 27 to the high-pressure turbine 24. The thus supplied main steam is expanded while passing through the high-pressure turbine 24 and the low-pressure turbine 25 so as to drive the generator 22 to make a rotational motion, and is then condensed by a steam condenser 28. A condensed water line 29, which is connected to the condenser 28, is provided with a condenser pump 30, a gland steam condenser 45, a low-pressure feedwater heater 46, a deaerator 47 and the other components, thus forming a condensed water system. A feedwater line 31, which is connected to the condensed water system, is provided with a feedwater pump 48, a high-pressure feedwater heater 49 and the other components. Condensed water circulates from the feedwater line 31 to the existing boiler 26. Steam for the steam turbine is generated in the existing boiler 26 through combustion of fuel. An exhaust gas passes through a not-shown purifier and is then discharged from a stack 32.

The gas turbine power unit B additionally provided has components serving as a gas turbine power facility 33 including a gas turbine 34, a combustor 34a, an air compressor 34b and a generator 35. An exhaust gas discharged from the gas turbine power facility 33 is sent to a heat recovery steam generator 37 through an exhaust gas flue 36. The exhaust gas contributes to generation of steam through heat exchange with the feedwater in the heat recovery steam generator 37 and then passes through a not-shown purifier and is discharged from a stack. The heat recovery steam generator 37, which has a high-pressure drum 50, an intermediate pressure drum 51a, a low-pressure drum 51, a de-NOX device 52 and the other components, is provided with further additional components such as a high-pressure superheater 53, a high-pressure reheater 54, a high-pressure economizer 55, a low-pressure reheater 56 and a low-pressure economizer 57 from the exhaust gas inlet side.

In the embodiment of the present invention, the line arranged on the downstream side of the condenser 28 branches off into two lines. One line serves as a feedwater line 38 for supplying the feedwater to the heat recovery steam generator 37. The feedwater line 38 is connected to a low-pressure economizer 57. The feedwater line 38 extending to the heat recovery steam generator 37 is provided with a feedwater pump 58. The feedwater line 38 branches off at a position of the feedwater pump 58 so that the resultant branch line is connected for example to the reheater 56. The other line portion serves as the above-mentioned feedwater line 31 extending to the existing boiler 26.

A steam line 39 extending from the heat recovery steam generator 37 and the steam line 27 extending from the existing boiler 26 are joined together and introduced into the high-pressure turbine 24.

Steam generated from the heat recovery steam generator 37 and the existing boiler 26 is supplied into the steam turbine 21 so as to do the work (i.e., drive the generator 22) and is then condensed by the condenser 28 and pressurized by the condenser pump 30. The thus pressurized condensed water circulates in the heat recovery steam generator 37 and the existing boiler 26.

The feedwater lines 31, 38 and the steam lines 27, 39 are provided with gate valves 40, 41, 42, 43, respectively so as to perform the switching operations of flows of steam and boiler feedwater, which are supplied to the steam turbine 21, by opening or closing these gate valves.

When all the gate valves 40, 41, 42, 43 are opened for example, steams generated in both the heat recovery steam generator 37 and the existing boiler 26 are supplied to the steam turbine 21 so as to perform a simultaneous power generation operation of the gas turbine power facility 33 and the steam turbine power facility 23.

When the existing boiler 26 is shutdown (not operated), the gate valve 40 of the feedwater line 31 and the gate valve 42 of the steam line 27 on the side of the existing boiler 26 are closed, and the gate valve 41 of the feedwater line 38 and the gate valve 43 of the steam line 39 on the side of the heat recovery steam generator 37 are opened, it is possible to perform a simultaneous power generation operation of the gas turbine power facility 33 and the steam turbine power facility 23 utilizing only the steam generated in the heat recovery steam generator 37.

Furthermore, when the gas turbine power facility 33 is not operated, the gate valve 40 of the feedwater line 31 and the gate valve 42 of the steam line 27 on the side of the existing boiler 26 are opened, and the gate valve 41 of the feedwater line 38 and the gate valve 43 of the steam line 39 on the side of the heat recovery steam generator 37 are closed in a manner reverse to the above-mentioned case, it is possible to perform a single power generation operation of only the steam turbine power facility 33 utilizing only the steam generated in the existing boiler 26.

In the above-mentioned embodiment of the present invention, there are provided reheat lines 60, 61 for distributing the steam, which has done the work in the high-pressure turbine 24 to reach a low temperature so that such a low-temperature reheated steam is distributed to the heat recovery steam generator 37 and the existing boiler 26 through these reheat lines 60, 61. The reheat lines 60, 61 have distributing valves 62, 63 for adjusting distribution ratio of the low-temperature reheated steam, respectively. The low-temperature reheated steam from each of the respective reheat lines 60, 61 is introduced into the heat recovery steam generator 37 and the existing boiler 26 via a different route from the main steam system so as to obtain a high-temperature reheated steam. The high-temperature steam, which is sent from the steam generator 37 through the steam line 64 having the distributing valve 64a and the high-temperature steam, which is sent from the boiler 26 through the steam line 65 having the distributing valve 65a, are joined together due to the joining of both the steam lines 64, 65 and are supplied to, for example, the intermediate pressure turbine 44. Provision of such distributing valves 62, 63 makes it possible to control equally the flow rate of the main steam of the heat recovery steam generator 37 and the flow rate of the low-temperature reheated steam, which flows into the heat recovery steam generator 37 so as to make the balance between the flow rate of the main steam and the flow rate of the reheated steam in an ordinary boiler equal to that of the existing steam turbine power facility during the operation thereof.

In addition, a control device, which is not shown, is provided for controlling the load of the entire system. The control device has a control function, in associated operation, by means of the gas turbine 34, the boiler 26 and the steam generator 37, or the gas turbine and the boiler 26 and steam generator 37. More specifically, the control of the load of the entire system can be made by controlling an amount of the fuel supplied into the gas turbine 34 or changing the power of the gas turbine 34 or an amount of the steam generated in the heat recovery steam generator 37. The load control can also be made by controlling an amount of the fuel supplied into the existing boiler 26 to change an amount of the steam generated in the existing boiler 26 or controlling both amounts of the fuel supplied into the gas turbine 34 and the existing boiler 26.

The steam condenser 28 is provided therein with a deaerating tray and a condenser recirculation system, which serve as the deaerator, not-shown. The deaerating of the condensed water with the use of the deaerator makes it possible to control the oxygen concentration of the feedwater. There may be used, as the deaerator included in the steam condenser, a steam bubbling device in a hot well.

In this embodiment of the present invention, a low-pressure feedwater heater 46 serving as the condensed water (condensate) heater located in the condensed water system is provided with an extraction line 67a for introducing the steam from the low-pressure turbine 25. A steam line 67 for introducing the steam, which is generated in the low-pressure drum 51 of the heat recovery steam generator 37, is connected to the above-mentioned extraction line 67a.

Introducing of the steam, which is generated in the low-pressure drum 51 of the heat recovery steam generator 37, into the low-pressure feedwater heater 46 through the steam line 67 and the extraction line 67a in this manner makes it possible to improve the efficiency of the low-pressure feedwater heater 46.

According to the above-described embodiment of the present invention, it is possible to provide the following effects in addition to the effects of remarkably improving the thermal efficiency, ensuring the plant power output, that is equal to that of the existing plant prior to remodeling, and permitting to carry out an independent operation of the existing steam turbine power unit and the other effects mentioned above, which are provided in the same manner as the first to third embodiments.

More specifically, the introducing of the steam, which is generated in the low-pressure drum 51 of the heat recovery steam generator 37, into the low-pressure feedwater heater 46 through the steam line 67 and the extraction line 67a makes it possible to improve the efficiency of the low-pressure feedwater heater 46.

Figure 5:
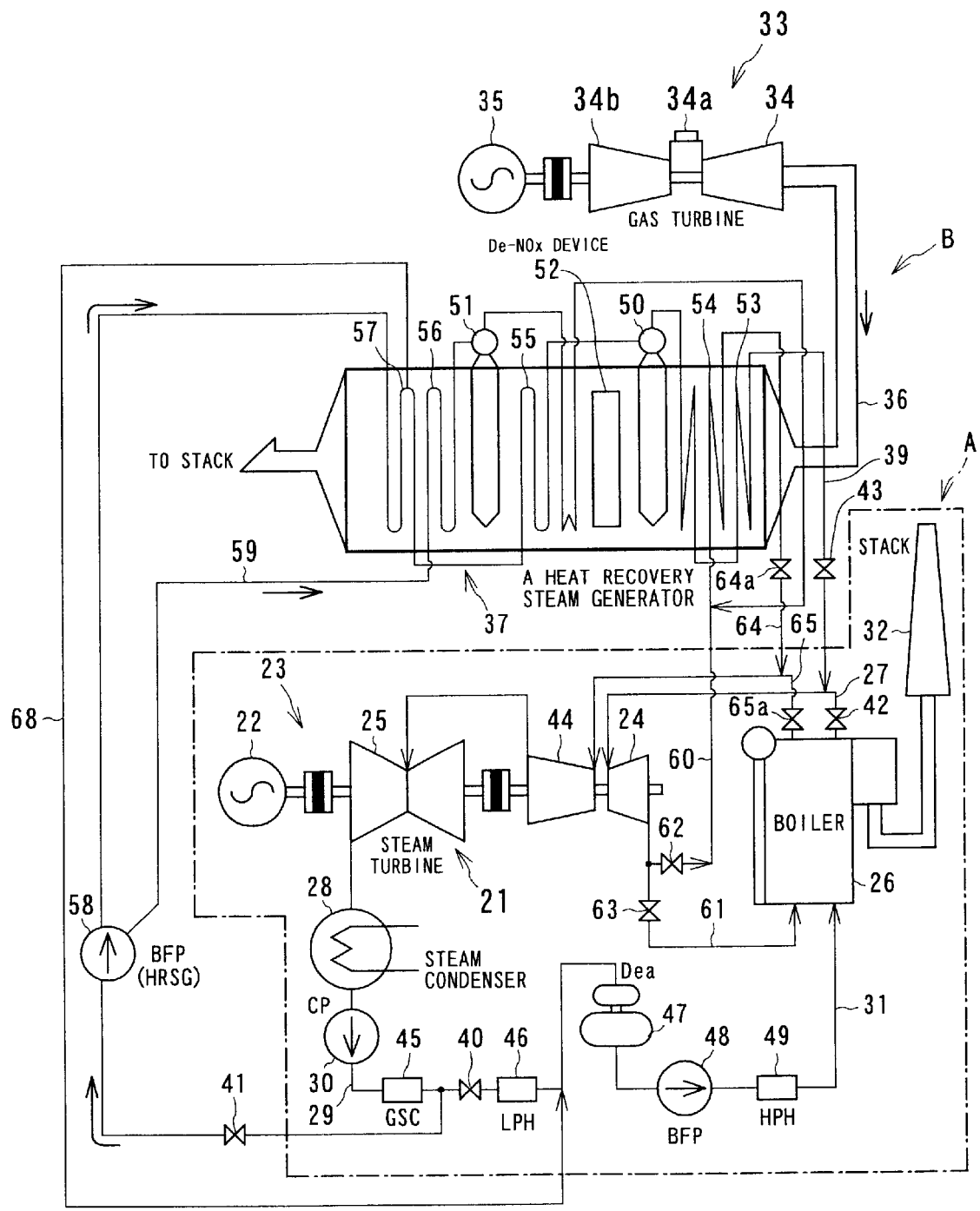
FIG. 5 is a schematic diagram of a system illustrating a fifth embodiment of a combined cycle power plant of the present invention.

Fifth Embodiment (FIG. 5)

FIG. 5 is a schematic diagram of a system illustrating the fifth embodiment of the present invention.

As shown in FIG. 5, the combined cycle power plant of the fifth embodiment of the present invention is also a combination of an existing steam turbine power unit A and a gas turbine power unit B additionally provided thereto. The steam turbine power unit A has a steam turbine power facility 23, which is composed of a steam turbine 21 and a generator 22. The steam turbine 21 has a three-stage structure of, for example, a high-pressure turbine 24, an intermediate pressure turbine 44 and a low-pressure turbine 25.

Main steam is supplied from a existing boiler 26 through a steam line 27 to the high-pressure turbine 24. The thus supplied main steam is expanded while passing through the high-pressure turbine 24 and the low-pressure turbine 25 so as to do drive the generator 22 to make a rotational motion and is then condensed by a steam condenser 28. A condensed water line 29, which is connected to the condenser 28, is provided with a condenser pump 30, a gland steam condenser 45, a low-pressure feedwater heater 46, a deaerator 47 and the other components, thus forming a condensed water system. A feedwater line 31, which is connected to the condensed water system, is provided with a feedwater pump 48, a high-pressure feedwater heater 49 and the other components. Condensed water circulates from the feedwater line 31 to the existing boiler 26. Steam for the steam turbine is generated in the existing boiler 26 through the combustion of the fuel. An exhaust gas passes through a not-shown purifier and is then discharged from a stack 32.

The gas turbine power unit B additionally provided has components serving as a gas turbine power facility 33 including a gas turbine 34, a combustor 34a, an air compressor 34b and a generator 35. An exhaust gas discharged from the gas turbine power facility 33 is sent to a heat recovery steam generator 37 through an exhaust gas flue 36. The exhaust gas contributes to the generation of the steam through heat exchange with the feedwater in the heat recovery steam generator 37, passes through a not-shown purifier and is then discharged from a stack 32. The heat recovery steam generator 37, which has a high-pressure drum 50, a low-pressure drum 51, a de-NOx device 52 and the other components, is provided with further additional components such as a high-pressure superheater 53, a high-pressure reheater 54, a high-pressure economizer 55, a low-pressure reheater 56 and a low-pressure economizer 57 from the exhaust gas inlet side.

In the embodiment of the present invention, the line arranged on the downstream side of the steam condenser 28 branches off into two lines. One line serves as a feedwater line 38 for supplying the feedwater to the heat recovery steam generator 37. The feedwater line 38 is connected to the low-pressure economizer 57. The feedwater line 38 extending to the heat recovery steam generator 37 is provided with a feedwater pump 58. The feedwater line 38 branches off at a position of the feedwater pump 58 so that the resultant branch line 59 is connected, for example, to the low-pressure reheater 56. The other line serves as the above-mentioned feedwater line 31 extending to the existing boiler 26.

A steam line 39 extending from the heat recovery steam generator 37 and the steam line 27 extending from the existing boiler 26 are joined together and introduced into the high-pressure turbine 24.

Steam generated from the heat recovery steam generator 37 and the existing boiler 26 is supplied into the steam turbine 21 so as to do the work (i.e., drive the generator 22) and then is condensed by the condenser 28 and pressurized by the condenser pump 30. The thus pressurized condensed water circulates in the heat recovery steam generator 37 and the existing boiler 26.

The feedwater lines 31, 38 and the steam lines 27, 39 are provided with gate valves 40, 41, 42, 43, respectively so as to perform the switching operations of flows of the steam and boiler feedwater, which are supplied to the steam turbine 21, by opening or closing these gate valves.

When all the gate valves 40, 41, 42, 43 are opened for example, steams generated in both the heat recovery steam generator 37 and the existing boiler 26 are supplied to the steam turbine 21 so as to perform a simultaneous power generation operation of the gas turbine power facility 33 and the steam turbine power facility 23.

When the existing boiler 26 is not opened, the gate valve 40 of the feedwater line 31 and the gate valve 42 of the steam line 27 on the side of the existing boiler 26 are closed, and the gate valve 41 of the feedwater line 38 and the gate valve 43 of the steam line 39 on the side of the heat recovery steam generator 37 are opened, it is possible to perform a simultaneous power generation operation of the gas turbine power facility 33 and the steam turbine power facility 23 utilizing only the steam generated in the heat recovery steam generator 37.

Furthermore, when the gas turbine power facility 33 is not operated (shutdown), the gate valve 40 of the feedwater line 31 and the gate valve 42 of the steam line 27 on the side of the existing boiler 26 are opened, and the gate valve 41 of the feedwater line 38 and the gate valve 43 of the steam line 39 on the side of the heat recovery steam generator 37 are closed in a manner reverse to the above-mentioned case, it is possible to perform a single power generation operation of only the steam turbine power facility 33 utilizing only the steam generated in the existing boiler 26.

In the above-mentioned embodiment of the present invention, there are provided reheat lines 60, 61 for distributing the steam, which has done the work in the high-pressure turbine 24 to reach a low temperature so that such a low-temperature steam is distributed to the heat recovery steam generator 37 and the existing boiler 26 through these reheat lines 60, 61. The reheat lines 60, 61 have distributing valves 62, 63 for adjusting distribution ratio of the low-temperature steam, respectively. The low-temperature steam from the respective reheat lines 60, 61 is introduced into the heat recovery steam generator 37 and the existing boiler 26 via a different route from the main steam system so as to obtain a high-temperature steam. The high-temperature steam, which is sent from the steam generator 37 through the steam line 64 having the distributing valve 64a, and the high-temperature steam, which is sent from the boiler 26 through the steam line 65 having the distributing valve 65a, are joined together due to the joining of both the steam lines 64, 65 and supplied to, for example, the intermediate pressure turbine 44. Provision of such distributing valves 62, 63 makes it possible to control equally the flow rate of the main steam of the heat recovery steam generator 37 and the flow rate of the low-temperature steam, which flows into the heat recovery steam generator 37 so as to make the balance between the flow rate of the main steam and the flow rate of the reheated steam in an ordinary boiler equal to that of the existing steam turbine power facility during the operation thereof.

In addition, a control device, which is not shown, is provided for controlling the load of the entire system. The control device has a control function, in an associated manner, by means of the gas turbine 34, the existing boiler 26 and the steam generator 37, or the gas turbine and the boiler 26 and the steam generator 37. More specifically, the control of the load of the entire system can be made by controlling an amount of the fuel supplied into the gas turbine 34 or changing the power of the gas turbine 34 or an amount of the steam generated in the heat recovery steam generator 37. The load control can also be made by controlling an amount of the fuel supplied into the existing boiler 26 to change an amount of the steam generated in the existing boiler 26 or controlling both the amounts of the fuel supplied into the gas turbine 34 and the existing boiler 26.

The steam condenser 28 is provided therein with a deaerating tray and a condenser recirculation system, which serve as the deaerator, not shown. The deaeration of the condensed water with the use of the deaerator makes it possible to control the oxygen concentration of the feedwater. There may be used, as the deaerator included in the condenser, a steam bubbling device in a hot well.

In this embodiment of the present invention, a feedwater line 68 for connecting the low-pressure economizer 57 to the upstream side of the deaerator 47 is further provided as a system for returning a part or all of feedwater, which is heated by the low-pressure economizer 57 provided in the heat recovery steam generator 37, to the feedwater or condensed water on the upstream side of the deaerator 47 provided on the condensed water line 29. The feedwater line 68 may be connected to the downstream side of the deaerator 47.

It is made possible, by returning a part or all of feedwater, which is heated in the low-pressure economizer 57, to the upstream or downstream side of the deaerator 47 through the feedwater line 68, to improve the efficiency of the existing boiler 26.

According to the above-described embodiment of the present invention, it is possible to provide the following effects in addition to the effects of remarkably improving the thermal efficiency, ensuring the plant power output, that is equal to that of the existing plant prior to remodeling and permitting to carry out an independent operation of the existing steam turbine power unit and the other effects mentioned above, which are provided in the same manner as that of the first to fourth embodiments.

More specifically, the returning of a part or all of feedwater, which is heated in the low-pressure economizer 57, to the upstream or downstream side of the deaerator 47 through the feedwater line 68 makes it possible to improve the efficiency of the existing boiler 26.

Figure 6:
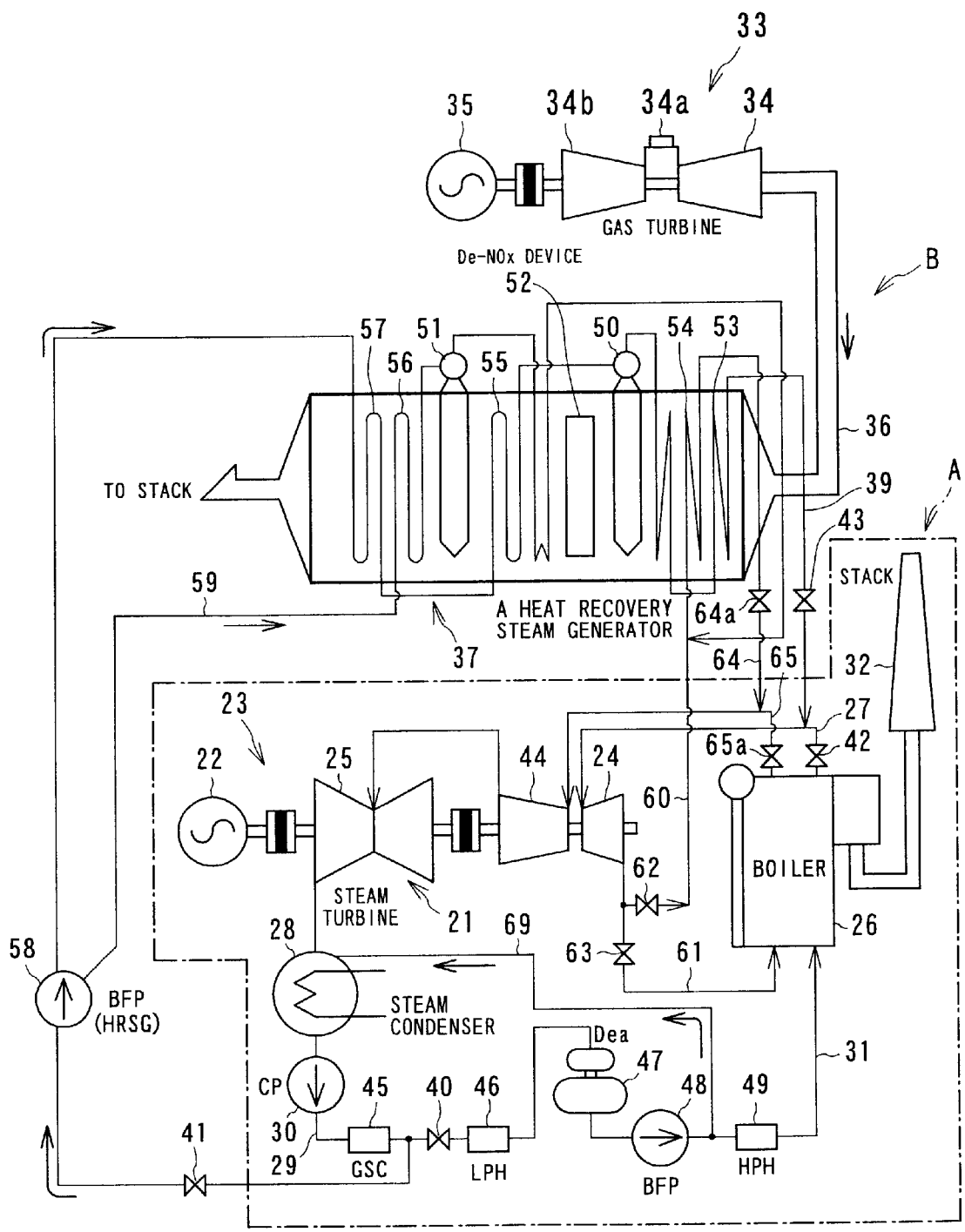
FIG. 6 is a schematic diagram of a system illustrating a sixth embodiment of a combined cycle power plant of the present invention.

Sixth Embodiment (FIG. 6)

FIG. 6 is a schematic diagram of a system illustrating the sixth embodiment of the present invention.

As shown in FIG. 6, the combined cycle power plant of the fourth embodiment of the present invention is a combination of the existing steam turbine power unit A and a gas turbine power unit B additionally provided thereto. The steam turbine power unit A has a steam turbine power facility 23, which is composed of a steam turbine 21 and a generator 22. The steam turbine 21 has a three-stage structure of, for example, a high-pressure turbine 24, an intermediate pressure turbine 44 and a low-pressure turbine 25.

Main steam is supplied from a existing boiler 26 through a steam line 27 to the high-pressure turbine 24. The thus supplied main steam is expanded while passing through the high-pressure turbine 24 and the low-pressure turbine 25 so as to do drive the generator 22 to make a rotational motion and is then condensed by a steam condenser 28. A condensed water line 29, which is connected to the condenser 28, is provided with a condenser pump 30, a gland steam condenser 45, a low-pressure feedwater heater 46, a deaerator 47 and the other components, thus forming a condensed water system. A feedwater line 31, which is connected to the condensed water system, is provided with a feedwater pump 48, a high-pressure feedwater heater 49 and the other components. Condensed water circulates from the feedwater line 31 to the existing boiler 26. Steam for the steam turbine is generated in the existing boiler 26 through the combustion of the fuel. An exhaust gas passes through a not-shown purifier and is then discharged from a stack 32.

The gas turbine power unit B additionally provided has components serving as a gas turbine power facility 33 including a gas turbine 34, a combustor 34a, an air compressor 34b and a generator 35. An exhaust gas discharged from the gas turbine power facility 33 is sent to a heat recovery steam generator 37 through an exhaust gas flue 36. The exhaust gas contributes to the generation of the steam through heat exchange with the feedwater in the heat recovery steam generator 37, passes through a not-shown purifier and is then discharged from a stack 32. The heat recovery steam generator 37, which has a high-pressure drum 50, a low-pressure drum 51, a de-NOx device 52 and the other components, is provided with further additional components such as a high-pressure superheater 53, a high-pressure reheater 54, a high-pressure economizer 55, a low-pressure reheater 56 and a low-pressure economizer 57 from the exhaust gas inlet side.

In the embodiment of the present invention, the line arranged on the downstream side of the condenser 28 branches off into two lines. One line serves as a feedwater line 38 for supplying the feedwater to the heat recovery steam generator 37. The feedwater line 38 is connected to the low-pressure economizer 57. The feedwater line 38 extending to the heat recovery steam generator 37 is provided with a feedwater pump 58. The feedwater line 38 branches off at a position of the feedwater pump 58 so that the resultant branch line 59 is connected to, for example, the low-pressure reheater 56. The other line portion serves as the above-mentioned feedwater line 31 extending to the existing boiler 26.

A steam line 39 extending from the heat recovery steam generator 37 and the steam line 27 extending from the existing boiler 26 are joined together and then introduced into the high-pressure turbine 24.

Steam generated from the heat recovery steam generator 37 and the existing boiler 26 is supplied into the steam turbine 21 so as to do the work (i.e., drive the generator 22) and is then condensed by the steam condenser 28 and pressurized by the condenser pump 30. The thus pressurized condensed water circulates in the heat recovery steam generator 37 and the existing boiler 26.

The feedwater lines 31, 38 and the steam lines 27, 39 are provided with gate valves 40, 41, 42, 43, respectively so as to perform the switching operations of flows of the steam and boiler feedwater, which are supplied to the steam turbine 21, by opening or closing these gate valves.

When all the gate valves 40, 41, 42, 43 are opened for example, the steams generated in both the heat recovery steam generator 37 and the existing boiler 26 are supplied to the steam turbine 21 so as to perform a simultaneous power generation operation of the gas turbine power facility 33 and the steam turbine power facility 23.

When the existing boiler 26 is not operated, the gate valve 40 of the feedwater line 31 and the gate valve 42 of the steam line 27 on the side of the existing boiler 26 are closed, and the gate valve 41 of the feedwater line 38 and the gate valve 43 of the steam line 39 on the side of the heat recovery steam generator 37 are opened, it is possible to perform a simultaneous power generation operation of the gas turbine power facility 33 and the steam turbine power facility 23 utilizing only the steam generated in the heat recovery steam generator 37.

Furthermore, when the gas turbine power facility 33 is not operated, the gate valve 40 of the feedwater line 31 and the gate valve 42 of the steam line 27 on the side of the existing boiler 26 are opened, and the gate valve 41 of the feedwater line 38 and the gate valve 43 of the steam line 39 on the side of the heat recovery steam generator 37 are closed in a manner reverse to the above-mentioned case, it is possible to perform a single power generation operation of only the steam turbine power facility 33 utilizing only the steam generated in the existing boiler 26.

In the above-mentioned embodiment of the present invention, there are provided reheat lines 60, 61 for distributing the steam, which has done the work in the high-pressure turbine 24 to reach a low temperature so that such a low-temperature steam is distributed to the heat recovery steam generator 37 and the existing boiler 26 through these reheat lines 60, 61. The reheat lines 60, 61 have distributing valves 62, 63 for adjusting distribution ratio of the low-temperature steam, respectively. The low-temperature steam from the respective reheat lines 60, 61 is introduced into the heat recovery steam generator 37 and the existing boiler 26 through a different route from the main steam system to obtain a high-temperature steam. The high-temperature steam, which is sent from the steam generator 37 through the steam line 64 having the distributing valve 64a, and the high-temperature steam, which is sent from the boiler 26 through the steam line 65 having the distributing valve 65a, are joined together due to the joining of both the steam lines 64, 65 and supplied to, for example, the intermediate pressure turbine 44. Provision of such distributing valves 62, 63 makes it possible to control equally the flow rate of the main steam of the heat recovery steam generator 37 and the flow rate of the low-temperature steam, which flows into the heat recovery steam generator 37 so as to make the balance between the flow rate of the main steam and the flow rate of the reheated steam in an ordinary boiler equal to that of the existing steam turbine power facility during the operation thereof.

In addition, a control device, not shown, is provided to control load of the entire system. The control device has a control function, in a cooperated manner, by means of the gas turbine 34, the steam generator 37 and the existing boiler 26, or the gas turbine and the steam generator 37 and the boiler 26. More specifically, the control of the load of the entire system can be made by controlling an amount of the fuel supplied into the gas turbine 34 or changing the power of the gas turbine 34 or an amount of the steam generated in the heat recovery steam generator 37. The load control can also be made by controlling an amount of the fuel supplied into the existing boiler 26 to change an amount of the steam generated in the existing boiler 26 or controlling both the amounts of the fuel supplied into the gas turbine 34 and the existing boiler 26.

The condenser 28 is provided therein with a deaerating tray and a condenser recirculation system, which serve as the deaerator, not shown. The deaeration of the condensed water with the use of the deaerator makes it possible to control oxygen concentration of the feedwater. There may be used, as the deaerator included in the steam condenser, a steam bubbling device in a hot well.

In this embodiment of the present invention, there is further provided a recirculation line for leading feedwater from the outlet of the deaerator 47 and returning it into the condenser 28. The feedwater thus returned has the oxygen concentration, which is sufficiently reduced by the deaerator. Accordingly, adjusting an amount of feedwater returned to the condenser 28 makes it possible to control the oxygen concentration of the feedwater.

According to the above-described embodiment of the present invention, it is possible to provide the following effects described below, in addition to the effects of remarkably improving the thermal efficiency, ensuring the plant power output, that is equal to that of the existing plant prior to remodeling and permitting to carry out an independent operation of the existing steam turbine power unit and the other effects mentioned above, which are provided in the same manner as the first to fifth embodiments.

More specifically, providing the recirculation line for leading the feedwater from the outlet of the deaerator 47 and returning it into the condenser 28 and adjusting an amount of the feedwater as returned to the condenser 28 make it possible to control the oxygen concentration of the feedwater.

Figure 7:
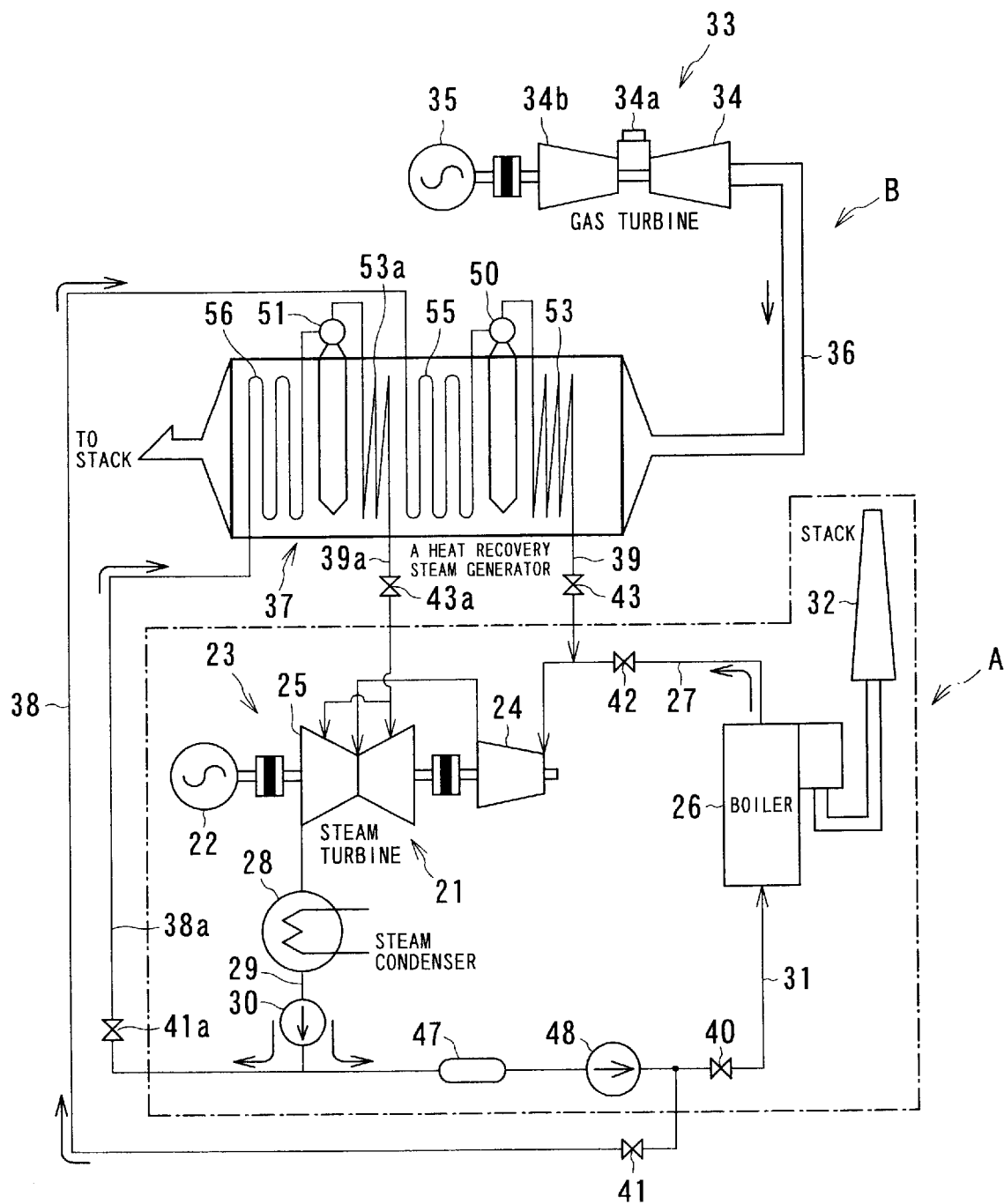
FIG. 7 is a schematic diagram of a system illustrating a seventh embodiment of a combined power plant of the present invention.

Seventh Embodiment (FIG. 7)

FIG. 7 is a schematic diagram of a system illustrating the seventh embodiment of the present invention.

As shown in FIG. 7, the combined cycle power plant of the seventh embodiment of the present invention is a combination of the existing steam turbine power unit A and a gas turbine power unit B additionally provided thereto. The steam turbine power unit A has a steam turbine power facility 23, which is composed of a steam turbine 21 and a generator 22. The steam turbine 21 has, for example, a two-stage structure of a high-pressure turbine 24 and a low-pressure turbine 25.

Main steam is supplied from a existing boiler 26 through a steam line 27 to the high-pressure turbine 24. The thus supplied main steam is expanded while passing through the high-pressure turbine 24 so as to drive the generator 22 to make a rotational motion. The steam rotating the high-pressure turbine 24 is further supplied to the low-pressure turbine 25 to do the expansion work. The respective high- and low-pressure turbines 24 and 25 drive the generator 22. The steam after the expansion work in the low-pressure turbine 25 is then condensed by a steam condenser 28. A condensed water line 29, which is connected to the condenser 28, is provided with a condenser pump 30, a deaerator 47, a feedwater pump 48, and other components, thus forming a condensed water system.

A feedwater line 31 which is connected to the condensed water system and to which the existing boiler 26 is connected so as to generate steam for the steam turbine through a burning of a fuel such as petroleum. An exhaust gas passes through a not-shown purifier and is then discharged from a stack 32.

The gas turbine power unit B additionally provided has components serving as a gas turbine power facility 33 such as a gas turbine 34, a combustor 34a, an air compressor 34b and a generator 35. An exhaust gas discharged from the gas turbine power facility 33 is sent to a heat recovery steam generator 37 through an exhaust gas flue 36. The exhaust gas contributes to the generation of the steam through heat exchange with the feedwater in the heat recovery steam generator 37, passes through a not-shown purifier and is then discharged from a stack 32. The heat recovery steam generator 37, which has a high-pressure drum 50, a low-pressure drum 51, and other components, is provided with further additional components such as a high-pressure superheater 53, a high-pressure economizer 55, a low-pressure superheater 53a, and a low-pressure reheater 56 from the exhaust gas inlet side.

In the embodiment of the present invention, the line arranged on the downstream side of the condensed water pump 30 branches off into two lines. One line serves as a low-pressure feedwater line 38a is connected to the low-pressure economizer for supplying the feedwater to the low-pressure reheater of the heat recovery steam generator 37. The feedwater supplied from the low-pressure feedwater line 38a is once heated by the low-pressure reheater and then led to the low-pressure drum 51. The steam in the low-pressure drum 51 is introduced, after the passing through the low-pressure superheater 53a, to a middle stage of the low-pressure turbine 25 through a gate valve 43a to do the expansion work therein. Thereafter, the steam is fed together with the steam from the high-pressure turbine 24 to the steam condenser 28 to form the condensed water which thereafter again circulates.

On the other hand, the other one line branched off on the downstream side of the condensed water pump 30 further branches off into two lines on the downstream side of a feedwater pump 48 in the condenser system. One of these lines serves as a feedwater line 31 and is connected to the existing boiler 26 and the other one line serves as a feedwater line 38 and is connected to the high-pressure economizer 55 in the heat recovery steam generator 37.

The feedwater supplied from the feedwater line 38 is heated in the high-pressure economizer 55, and thereafter, fed to the high-pressure drum 50 and then evaporated as high-pressure steam. The high-pressure steam in the high-pressure drum 50 passes through the high-pressure superheater 53 and is joined on the downstream side of a gate valve 42 of the steam line 27 from the existing boiler 26 through a gate valve 43. The steam after the expansion work in the high-pressure turbine 24 is supplied to the low-pressure turbine 25 to again do the expansion work, and thereafter, the steam is fed to the condenser 28 to have a form of condensed water which again circulates.

The feedwater lines 31, 38, 38a and the steam lines 27, 39, 39a are mounted with gate valves 40, 41, 41a, 42, 43, 43a, respectively, and the flow rate of the steam to be supplied to the steam turbine 21 and the flow of the boiler feedwater can be changed by opening or closing these gave valves 40, 41, 41a, 42, 43, 43a.

For example, by closing the gate valves 41, 41a, 43, 43a, the condensed water from the condenser 28 does not reach the feedwater lines 38, 38a connected to the heat recovery steam generator 37, and simultaneously, the steam from the heat recovery steam generator 37 is not also supplied to the low-pressure turbine 25 and the high-pressure turbine 24. Accordingly, the steam turbine 21 can be operated only by the steam from the existing boiler 26, so that the generator 22 can be driven to be rotated without operating the gas turbine power facility 33.

On the other hand, by closing the gate valves 40, 42, the condensed water from the steam condenser 28 is not supplied to the existing boiler 26 and the steam from the existing boiler 26 is also not supplied to the high-pressure turbine 24. That is, the steam turbine 21 can be driven only by the steam from the heat recovery steam generator 37 without operating the existing boiler 26, and moreover, the generator 35 of the gas turbine power facility 33 and the generator 22 of the steam turbine power facility 23 can be simultaneously driven.

In addition to the above advantageous functions, by designing the gate valves mentioned above as regulation valves, it becomes possible to regulate the flow rate of the steam from the heat recovery steam generator 37 and the existing boiler 26, and moreover, it becomes also possible to adopt the most effective operation method in response to the load of the generator.

As mentioned above, according to this seventh embodiment, as mentioned hereinabove with respect to the first to sixth embodiments, the operational efficiency can be remarkably improved, the plant power output can be surely maintained as like as that before the improvement, the independent operation in the existing steam turbine power plant can be made possible, and other many effective functions can be achieved such as mentioned hereinabove.

Figure 8:
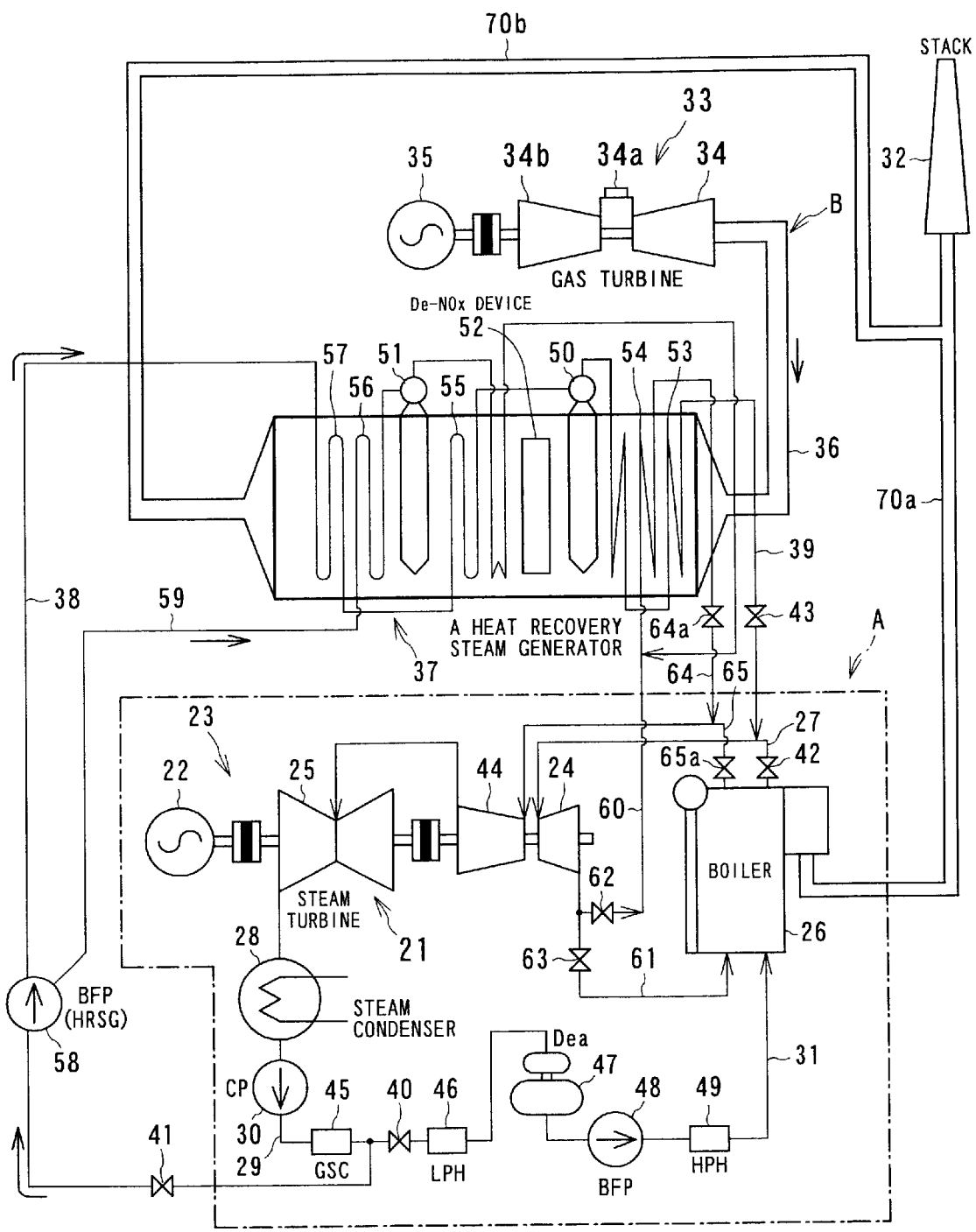
FIG. 8 is a schematic diagram of a system illustrating one structural example of an eighth embodiment of a combined cycle power plant of the present invention.
Figure 9:
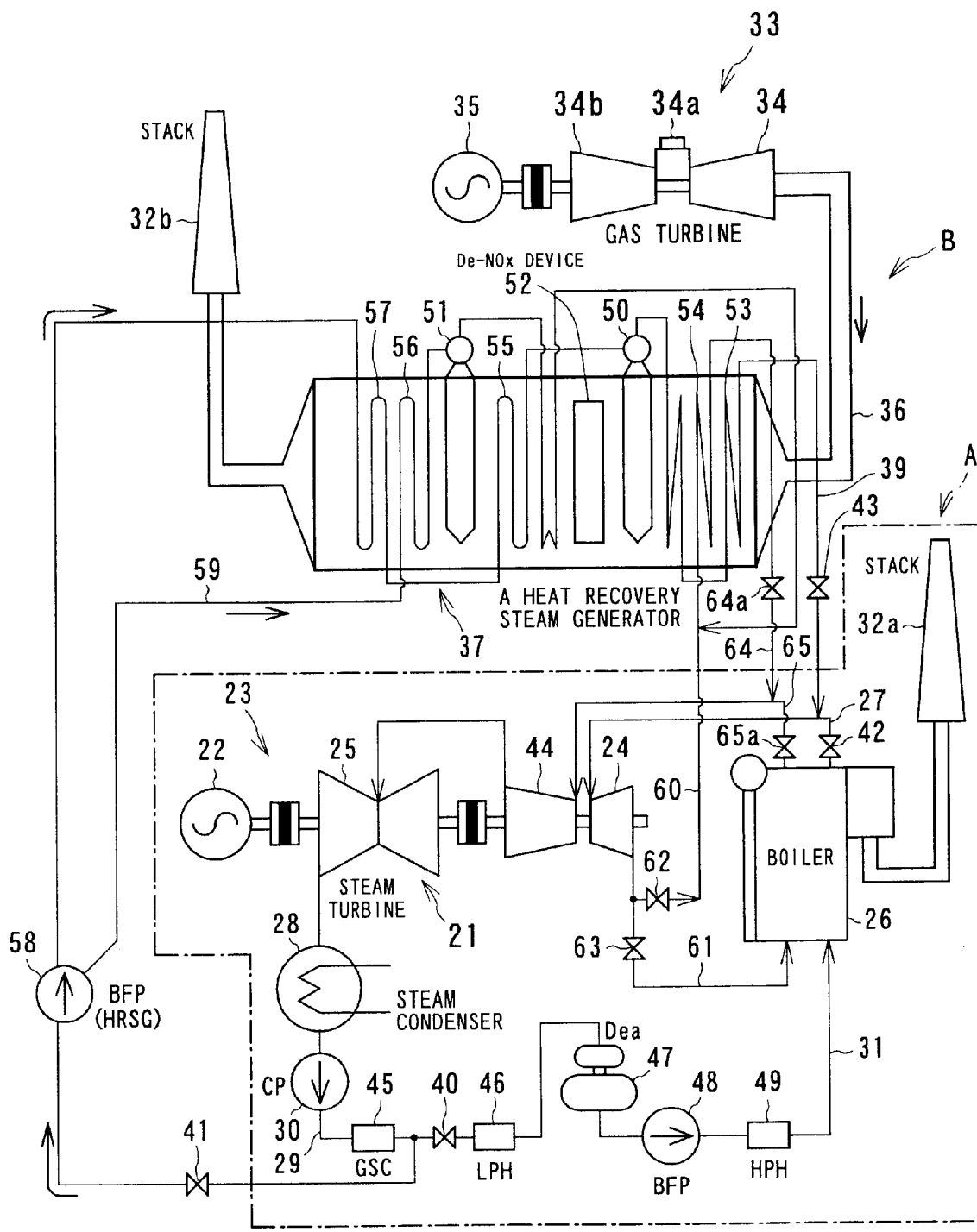
FIG. 9 is a schematic diagram of a system illustrating another structural example of the eighth embodiment of the combined cycle power plant of the present invention.
Figure 10:
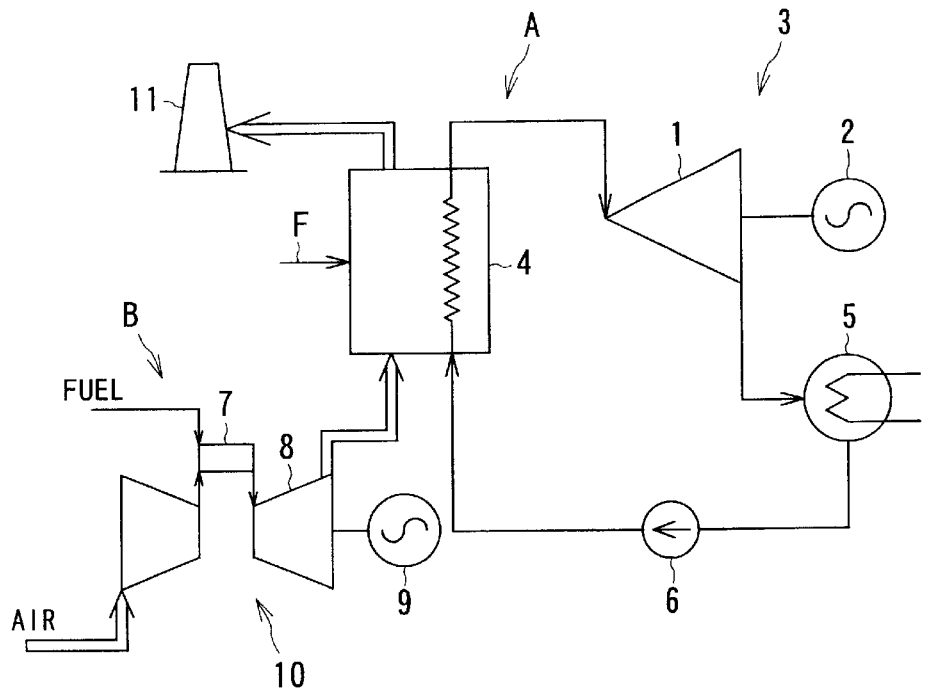
FIG. 10 is a schematic diagram of a system illustrating a conventional combined cycle power plant.
Figure 11:
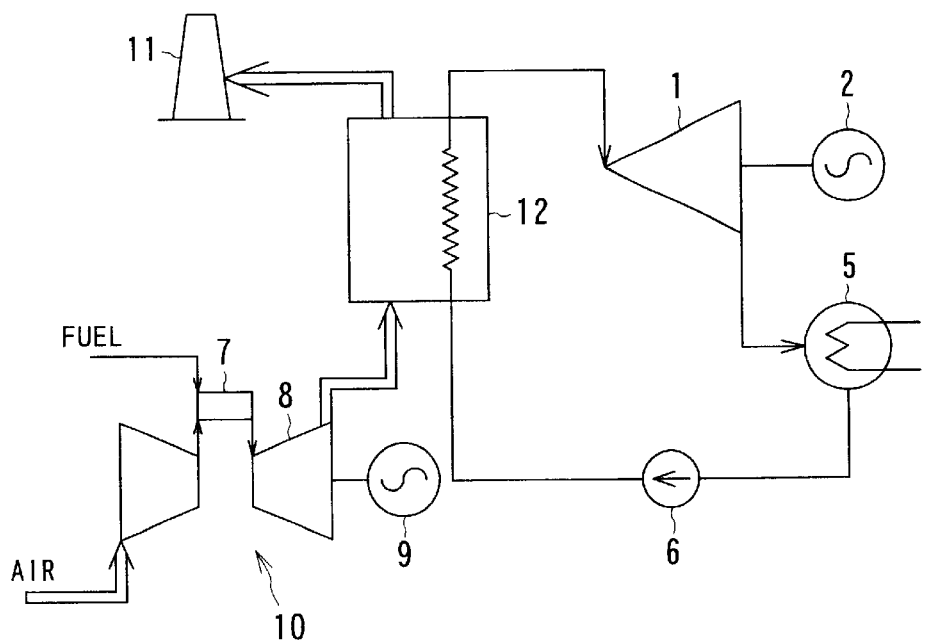
FIG. 11 is a schematic diagram of a system illustrating another conventional combined cycle power plant.

Eighth Embodiments (FIGS. 8 and 9)

FIGS. 8 and 9 are schematic diagrams of a system illustrating the eighth embodiments of the present invention. FIG. 8 illustrates one structural example and FIG. 9 illustrates the other structural example. Since the combined cycle power plants as shown in FIGS. 8 and 9 have the same system structure as that shown in FIG. 2, the same reference numerals of the components as shown in FIG. 2 are given to those as shown in FIGS. 8 and 9 and description of the same components is omitted.

In the example as shown in FIG. 8, there is provided a single common stack for discharging the exhaust gas from the heat recovery steam generator 37 and the exhaust gas from the existing boiler 26 through ducts 70a, 70b.

Such a structure makes it possible to simplify the power plant equipment and reduce investment therefore, in a case where an ordinary boiler and an ordinary steam turbine power facility have already been established. Utilization of the stack of the existing ordinary boiler makes it possible to join together the exhaust gas from the heat recovery steam generator and the exhaust gas from the ordinary boiler to discharge effectively them through the single common stack.

In the example as shown in FIG. 9, there are provided independently a stack 32b for discharging the exhaust gas from the heat recovery steam generator 37 and a stack 32a for discharging the exhaust gas from the existing boiler 26. Such a structure can effectively cope with a case where circumstances such as an establishment place hinder common use of the stack.

The present invention is not limited only to the above-described embodiments. There may be made a modification in type of the heat exchanger, which is connected to the heat recovery steam generator side on the respective lines for connecting the existing steam turbine power facility to the heat recovery steam generator, on the basis of the output power of the heat recovery steam generator, requirements of steam of the steam turbine, thermal efficiency as required and the like.

What is claimed is:

1. A combined cycle power plant, comprising:

a gas turbine power facility;

a heat recovery steam generator into which an exhaust gas is introduced from the gas turbine power facility;

a steam turbine power facility having a steam turbine mounted to a shaft different from a shaft on which the gas turbine power facility is mounted;

an existing boiler for supplying steam to the steam turbine power facility;

a system for introducing steam, which is generated in the heat recovery steam generator and the existing boiler, into the steam turbine of the steam turbine power facility through steam lines, which extend from the existing boiler and the heat recovery steam generator boilers and are then joined together; and a system for causing a line, which is arranged on a downstream side of a steam condenser provided in the steam turbine power facility, to branch off into feedwater lines, and supplying condensed water condensed by a condenser into the heat recovery steam generator and the existing boiler, wherein said steam lines extending from the heat recovery steam generator and the existing boiler to the steam turbine and the feedwater lines extending from a condenser pump of the condenser to the heat recovery steam generator and the existing boiler are provided with valves, respectively, to permit selection of any one of three operation patterns of: a simultaneous power generation operation of the gas turbine power facility and the steam turbine power facility utilizing the steam generated in the existing boiler and the heat recovery steam generator; a simultaneous power generation operation of the gas turbine power facility and the steam turbine power facility utilizing only the steam generated in the heat recovery steam generator, while stopping the operation of the existing boiler; and a single power generation operation of only the steam turbine power facility utilizing only the steam generated in the existing boiler, while stopping the operation of the gas turbine.

2. A combined cycle power plant according to claim 1, wherein said heat recovery steam generator is provided with a low-pressure economizer and there is provided a system for returning at least a part of feedwater, which is heated by the low-pressure economizer, to feedwater or condensed water on an upstream or downstream side of a deaerator provided on a condensed water line.

3. A combined cycle power plant according to claim 2, wherein a recirculation line is arranged for returning the condensed water from the downstream side of the deaerator to the steam condenser to control oxygen concentration of the feedwater.

4. A combined cycle power plant according to claim 2, wherein said steam condenser is provided, therein, with a deaerating device to control oxygen concentration of the feedwater.

5. A combined cycle power plant according to claim 1, further comprising a control device for controlling load of all the systems in accordance with an operation of at least one of the gas turbine and the existing boiler and the heat recovery steam generator.

6. A combined cycle power plant according to claim 1, wherein a single common stack is arranged for discharging the exhaust gas from the heat recovery steam generator and the exhaust gas from the existing boiler.

7. A combined cycle power plant according to claim 1, wherein a fist stack is arranged for discharging the exhaust gas from the heat recovery steam generator and a second stack is arranged, independently from the first stack, for discharging the exhaust gas from the existing boiler.

8. A combined cycle power plant comprising:
a gas turbine power facility;
a heat recovery steam generator into which an exhaust gas is introduced from the gas turbine power facility;
a steam turbine power facility provided with a steam turbine mounted on a shaft which is different from a shaft on which the gas turbine power facility is mounted, said steam turbine power facility including high, intermediate and low pressure turbines;
an existing boiler for supplying steam to the steam turbine power facility;
a system for introducing main steam, which is generated in the heat recovery steam generator and the existing boiler, into the high-pressure turbine of the steam turbine power facility through steam lines, which extend from the existing boiler and the heat recovery steam generator and are then joined together;
a system for distributing the steam, which has done work in the high-pressure turbine so as to reach a low temperature, to the heat recovery steam generator and the existing boiler through reheat lines and for supplying the steam, which has been reheated by the heat recovery steam generator and the existing boiler to a high-temperature reheat steam, to the intermediate and low pressure turbines in a combined state; and
a system for causing a line, which is arranged on a downstream side of a steam condenser provided in the steam turbine power facility, to branch off into feedwater lines, to supply condensed water condensed by the condenser into the heat recovery steam generator and the existing boiler1
wherein said steam lines extending from the heat recovery steam generator and the existing boiler to the steam turbine and said feedwater lines extending from a condenser pump of the condenser to the heat recovery steam generator and the existing boiler are provided with valves, respectively, to permit selection of any one of three operation patterns of: a simultaneous power generation operation of the gas turbine power facility and the steam turbine power facility utilizing the steam generated in both the existing boiler and the heat recovery steam generator; a simultaneous power generation operation of the gas turbine power facility and the steam turbine power facility utilizing only the steam generated in the heat recovery steam generator, while stopping the operation of the existing boiler; and a single power generation operation of only the steam turbine power facility utilizing only the steam generated in the existing boiler, while stopping the operation of the gas turbine.

9. A combined cycle power plant according to claim 8, wherein a steam line is arranged for introducing the steam generated from the heat recovery steam generator into a first stage of the low pressure turbine or a middle stage thereof of the steam turbine power facility or a middle stage of the intermediate pressure turbine.

10. A combined cycle power plant according to claim 8, wherein an extraction line is arranged for introducing the steam from the lower pressure turbine into a condensed water heater, which is disposed in a condensation system of the steam turbine power facility, and a line for introducing the steam generated from the heat recovery steam generator is connected to the extraction line.

11. A combined cycle power plant according to claim 8, wherein said heat recovery steam generator is provided with a low-pressure economizer and there is provided a system for returning at least a part of feedwater, which is heated by the low-pressure economizer, to feedwater or condensed water on an upstream or downstream side of a deaerator provided on a condensed water line.

12. A combined cycle power plant according to claim 9, wherein said steam condenser is provided, therein, with a deaerating device to control oxygen concentration of the feedwater.

13. A combined cycle power plant according to claim 11, wherein a recirculation line is arranged for returning the condensed water from the downstream side of the deaerator to the steam condenser to control oxygen concentration of the feedwater.

14. A combined cycle power plant according to claim 8, wherein at least one of reheat lines, which introduce the low temperature steam from the high-pressure turbine to the heat recovery steam generator or the existing boiler, is provided with a distributing valve for adjusting a distribution ratio of the steam having the low temperature.

15. A combined cycle power plant according to claim 8, further comprising a control device for controlling load of all the systems in accordance with an operation of at least one of the gas turbine, the heat recovery steam generator and the existing boiler.

16. A combined cycle power plant according to claim 8, wherein a single common stack is arranged for discharging the exhaust gas from the heat recovery steam generator and the exhaust gas from the existing boiler.

17. A combined cycle power plant according to claim 8, wherein a fist stack is arranged for discharging the exhaust gas from the heat recovery steam generator and a second stack is arranged, independently from the first stack, for discharging the exhaust gas from the existing boiler.

18. A combined cycle power plant comprising:
a gas turbine power facility;
a heat recovery steam generator into which an exhaust gas is introduced from the gas turbine power facility;
a steam turbine power facility provided with a steam turbine mounted on a shaft which is different from a shaft on which the gas turbine power facility is mounted, said steam turbine power facility including high and low pressure turbines;
an existing boiler for supplying steam to the steam turbine power facility;
a system for introducing steam, which is generated in the heat recovery steam generator and the existing boiler, into the steam turbine through steam lines, which extend from the existing boiler and the heat recovery steam generator and are then joined together;
a system for introducing steam, which is generated in the heat recovery steam generator, into a middle stage of the low pressure turbine of the steam turbine power facility through a low pressure economizer, a low pressure drum, and a low pressure superheater;
a system for supplying feedwater condensed by a steam condenser to a low pressure stage by branching off lines at an outlet portion of a condenser pump provided for the steam turbine power facility and for supplying feedwater to the heat recovery steam generator; and
a system for supplying feedwater, which is supplied to the existing boiler, to a feedwater pump through a deaerator, branching off lines at an outlet portion of the feedwater pump, supplying the feedwater to a high pressure stage of the heat recovery steam generator and the existing boiler, and supplying steam which is generated from the feedwater supplied to the high pressure stage of the heat recovery steam generator to the high pressure turbine, after joining to steam generated from the existing boiler, through a high pressure economizer, a high pressure drum and a high pressure steam superheater.

* * * * *